United States Patent
Slotznick

(10) Patent No.: US 12,244,655 B1
(45) Date of Patent: *Mar. 4, 2025

(54) INTERPERSONAL NETWORKING IN VIRTUAL SPACE PRE-MEETING WAITING ROOMS AND POST-MEETING SESSIONS FOR PARTICIPANTS OF A VIDEOCONFERENCING SESSION

(71) Applicant: Benjamin Slotznick, Mt. Gretna, PA (US)

(72) Inventor: Benjamin Slotznick, Mt. Gretna, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/950,779

(22) Filed: Nov. 18, 2024

Related U.S. Application Data

(63) Continuation-in-part of application No. 18/608,181, filed on Mar. 18, 2024, now Pat. No. 12,149,567.

(60) Provisional application No. 63/457,934, filed on Apr. 7, 2023, provisional application No. 63/482,919, filed on Feb. 2, 2023.

(51) Int. Cl.
*H04L 65/401* (2022.01)
*H04L 9/40* (2022.01)
*H04L 65/1069* (2022.01)
*H04L 65/1093* (2022.01)

(52) U.S. Cl.
CPC .......... *H04L 65/4015* (2013.01); *H04L 63/08* (2013.01); *H04L 65/1069* (2013.01); *H04L 65/1093* (2013.01)

(58) Field of Classification Search
CPC . H04L 63/08; H04L 65/1069; H04L 65/1093; H04L 65/4015
See application file for complete search history.

(56) References Cited

U.S. PATENT DOCUMENTS

| | | |
|---|---|---|
| 5,471,318 A | 11/1995 | Ahuja et al. |
| 7,398,295 B2 | 7/2008 | Shoroff et al. |
| 7,809,124 B2 | 10/2010 | Archambault et al. |
| 8,005,203 B2 | 8/2011 | Archambault et al. |

(Continued)

OTHER PUBLICATIONS

Birnholtz et al., "Open Messenger: Gradual Initiation of Interaction for Distributed Workgroups," CHI 2008 Proceedings Collaboration and Cooperation, Apr. 5-10, Florence, Italy, 4 pages (2008).

(Continued)

*Primary Examiner* — George C Neurauter, Jr.
(74) *Attorney, Agent, or Firm* — Panitch Schwarze Belisario & Nadel LLP

(57) ABSTRACT

An automated method and computer program product allows meeting participants of a host-scheduled videoconferencing session to interact with each other via an online meeting user interface of a videoconferencing system using their respective participant computers prior to initiation of the host-scheduled videoconferencing session. The meeting participants request to join the host-scheduled videoconferencing session by sending a request to the videoconferencing system from their respective participant computers, and the videoconferencing system provides a waiting room for the meeting participants to be placed in prior to the initiation of the host-scheduled videoconferencing session. In addition, a post-meeting session is provided for allowing the participants to interact with each other subsequent to the end of the host-scheduled videoconferencing session.

20 Claims, 15 Drawing Sheets

(56) References Cited

U.S. PATENT DOCUMENTS

| | | |
|---|---|---|
| 8,194,841 B2 | 6/2012 | Archambault et al. |
| 9,508,197 B2 | 11/2016 | Quinn et al. |
| 10,091,257 B2 | 10/2018 | Coffman et al. |
| 10,469,801 B2 | 11/2019 | McArdle |
| 10,567,450 B1 | 2/2020 | Gopal et al. |
| 11,107,490 B1 | 8/2021 | Slotznick |
| 11,144,885 B2 | 10/2021 | Rosenberg |
| 11,282,532 B1 | 3/2022 | Slotznick |
| 11,330,021 B1 | 5/2022 | Slotznick |
| 11,336,864 B1 | 5/2022 | Han et al. |
| 11,343,293 B1 | 5/2022 | Slotznick |
| 11,379,799 B1 | 7/2022 | Budkiewicz et al. |
| 11,444,990 B1 | 9/2022 | Slotznick |
| 11,601,618 B1 | 3/2023 | Slotznick |
| 11,763,267 B1 | 9/2023 | Budkiewicz et al. |
| 11,803,817 B2 | 10/2023 | Shiner |
| 11,936,813 B2 | 3/2024 | Chau et al. |
| 2007/0208806 A1 | 9/2007 | Mordecai et al. |
| 2020/0112450 A1 | 4/2020 | Chhabra et al. |
| 2023/0353403 A1 | 11/2023 | Mayfield et al. |
| 2024/0039746 A1 | 2/2024 | Swerdlow |

OTHER PUBLICATIONS

Diaz et al., "Making Space for Social Time: Supporting Conversational Transitions Before, During, and After Video Meetings," In 2022 Symposium on Human-Computer Interaction forWork (CHIWORK '22), Jun. 8-9, 2022, Durham, NH, USA ACM, 11 pages (2022).

Flymachine, "How do I know if I am in the Waiting Room?," downloaded from https://support.my.uq.edu.au/app/answers/detail/a_id/2922/~/how-do-i-manage-the-waiting-room-in-a-zoom-meeting retrieved on Apr. 11, 2024.

Keiles, Jamie Lauren, "The Things That Come to Those Who Wait," downloaded from https://www.racked.com/2018/1/17/16897160/lines-waiting-history retrieved on Apr. 10, 2024, Published Jan. 17, 2018, 5 pages.

Lariviere, Marty, "Do people join a line because it is long?," downloaded from https://operationsroom.wordpress.com/2014/06/26/do-people-join-a-line-because-it-is-long/ retrieved on Apr. 10, 2024, Published Jun. 26, 2014, 3 pages.

Queue-It, "Virtual Queuing Software," downloaded from https://queue-it.com/queuing-software retrieved on Apr. 11, 2024, 3 pages.

Software Advice, "SplitCam," downloaded from https://www.softwareadvice.com/live-streaming/splitcam-profile/ retrieved on Apr. 11, 2024.

The University of Queensland Australia, "How do I manage the waiting room in a Zoom meeting?," downloaded from https://support.my.uq.edu.au/app/answers/detail/a_id/2922/~/how-do-i-manage-the-waiting-room-in-a-zoom-meeting retrieved on Apr. 11, 2024, 3 pages.

True, Jessica, "Queue Management Systems (QMS) 101: How to Control the Flow of Waiting Lines Effectively," downloaded from https://blog.timify.com/control-waiting-lines-with-queue-management-systems/ retrieved on Apr. 10, 2024, Published Jun. 15, 2022, 6 pages.

Twine, "Speed Networking for Virtual Events," downloaded from https://www.twine.us/ retrieved on Apr. 11, 2024, 6 pages.

Wang et al., "Method for guiding crowd evacuation at exit: The buffer zone," downloaded from https://www.sciencedirect.com/science/article/abs/pii/S0925753518317053 retrieved on Apr. 11, 2024, vol. 118, Oct. 2019, pp. 88-95.

Wikipedia, "Network theory," downloaded from https://en.wikipedia.org/wiki/Network_theory retrieved retrieved on Apr. 10, 2024, 12 pages.

Wikipedia, "Queue area," downloaded from https://en.wikipedia.org/wiki/Queue_management_system retrieved on Apr. 10, 2024, 7 pages.

Wikipedia, "Queueing theory," downloaded from https://en.wikipedia.org/wiki/Queueing_theory retrieved on Apr. 10, 2024, 13 pages.

Wikipedia, "Queue-it," downloaded from https://en.wikipedia.org/wiki/Queue-it retrieved on Apr. 10, 2024, 2 pages.

Wikipedia, "Shortest path problem," downloaded from https://en.wikipedia.org/wiki/Widest_path_problem retrieved on Apr. 10, 2024, 7 pages.

Wikipedia, "Shortest path problem," downloaded from https://en.wikipedia.org/wiki/Shortest_path_problem retrieved on Apr. 10, 2024, 13 pages.

Wikipedia, "Speed networking," downloaded from https://en.wikipedia.org/wiki/Speed_networking retrieved on Apr. 10, 2024, 5 pages.

Wikipedia,"Chatroulette," downloaded from https://en.wikipedia.org/wiki/Chatroulette retrieved on Apr. 10, 2024, 6 pages.

Wonder, "The Waiting Room," downloaded from https://help.wonder.me/en/articles/5775824-the-waiting-room retrieved on Apr. 11, 2024. Document marked: last update Jan. 29, 2022. Original posting date: unknown, 2 pages.

Zoom Video Communications, Inc. "Green Room Process," downloaded from https://support.zoom.US/hc/en-us/articles/360051861511-Green-Room-Process retrieved on Apr. 11, 2024, Document marked: last update Oct. 28, 2023. Original posting date: unknown, 3 pages.

Zoom Video Communications, Inc. "Using Webinar Backstage," downloaded from https://support.zoom.us/hc/en-us/articles/4710061514381 retrieved on Apr. 11, 2024, Document marked: last update Mar. 27, 2024. Original posting date: unknown, 10 pages.

Zoom Video Communications, Inc., "Enabling and customizing the Waiting Room," downloaded from https://support.zoom.us/hc/en-us/articles/4905283822733-Enabling-and-customizing-the-Waiting-Room retrieved on Apr. 11, 2024, Document marked: last update Oct. 28, 2023. Original posting date: unknown, 6 pages.

Zoom Video Communications, Inc., "Managing participants in a meeting," downloaded from https://support.zoom.us/hc/en-us/articles/115005759423-Managing-participants-in-a-meeting retrieved on Apr. 11, 2024, 10 pages.

Zoom Video Communications, Inc.,"How to Keep Uninvited Guests Out of Your Zoom Meeting," downloaded from https://blog.zoom.us/keep-uninvited-guests-out-of-your-zoom-meeting/ retrieved on Apr. 11, 2024. Document marked: last update Oct. 5, 2022. Published Jul. 26, 2021, 4 pages.

Zoom Video Communications, Inc.,"Placing participants in waiting room," downloaded from https://support.zoom.us/hc/en-us/articles/201362813 retrieved on Apr. 11, 2024. Document marked: last update Jan. 23, 2024, 2 pages.

Zoom Video Communications, Inc., "Using Waiting Room," downloaded from https://support.zoom.us/hc/en-us/articles/115000332726-Waiting-Room retrieved on Apr. 11, 2024, Document marked: last update Nov. 21, 2023. Original posting date: unknown, 13 pages.

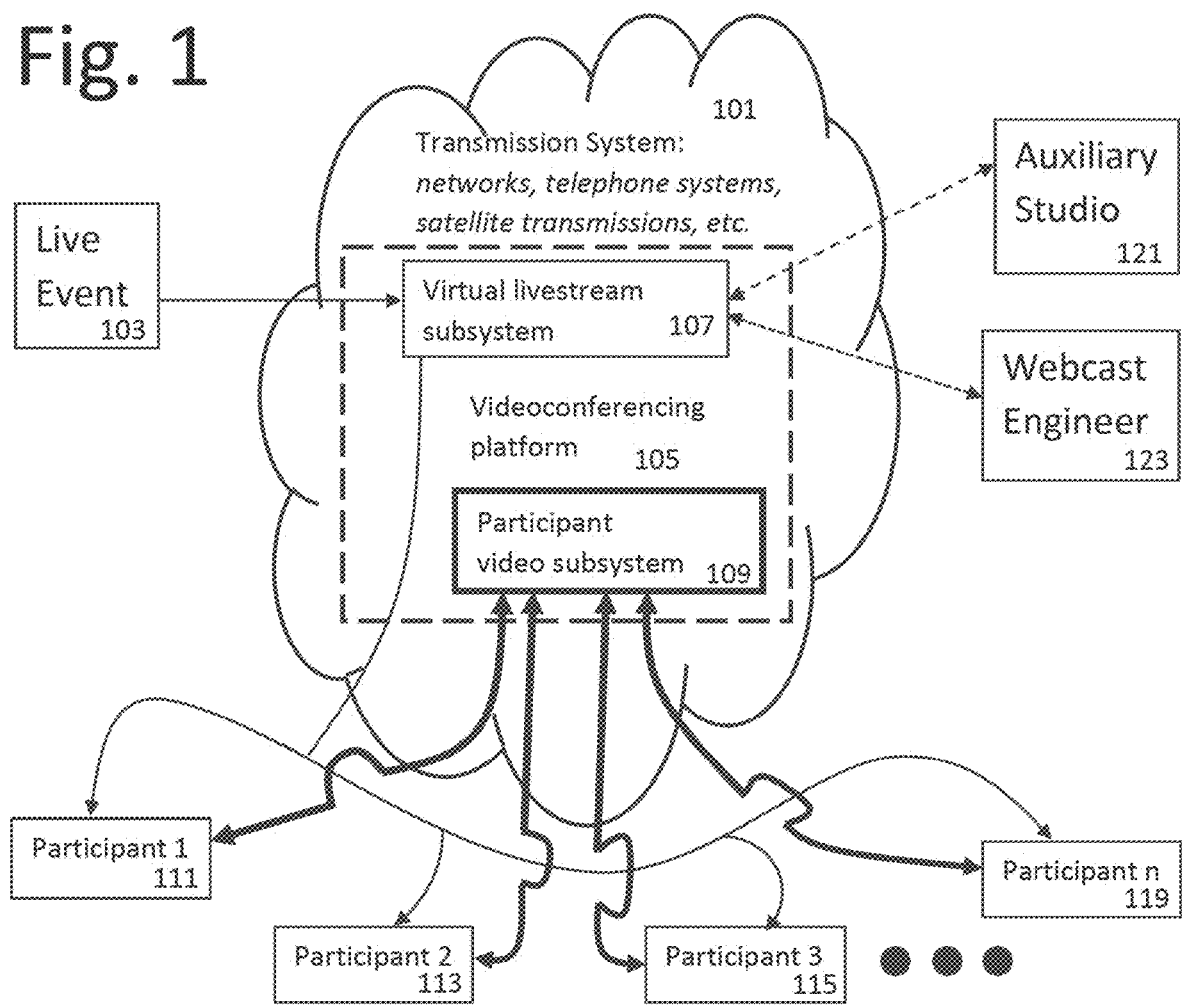
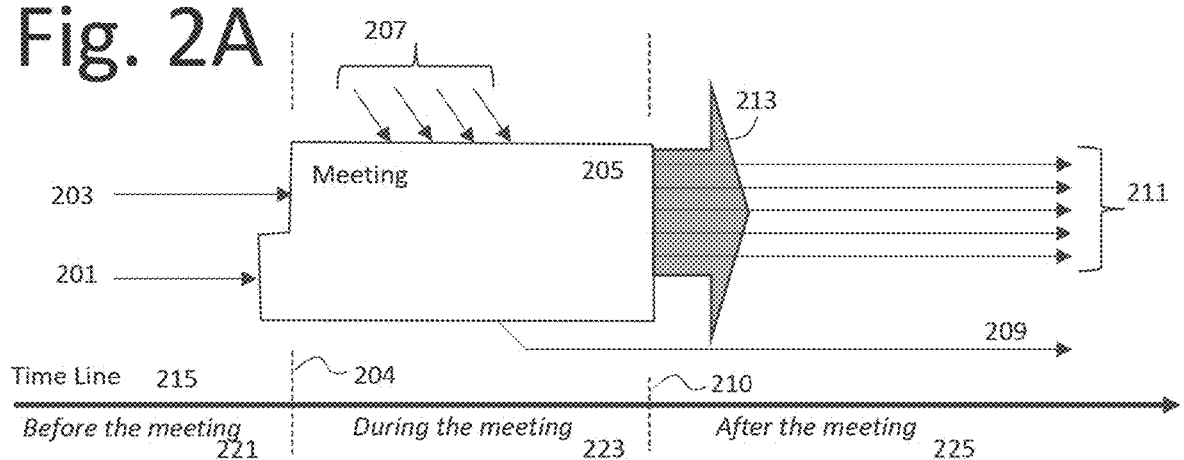

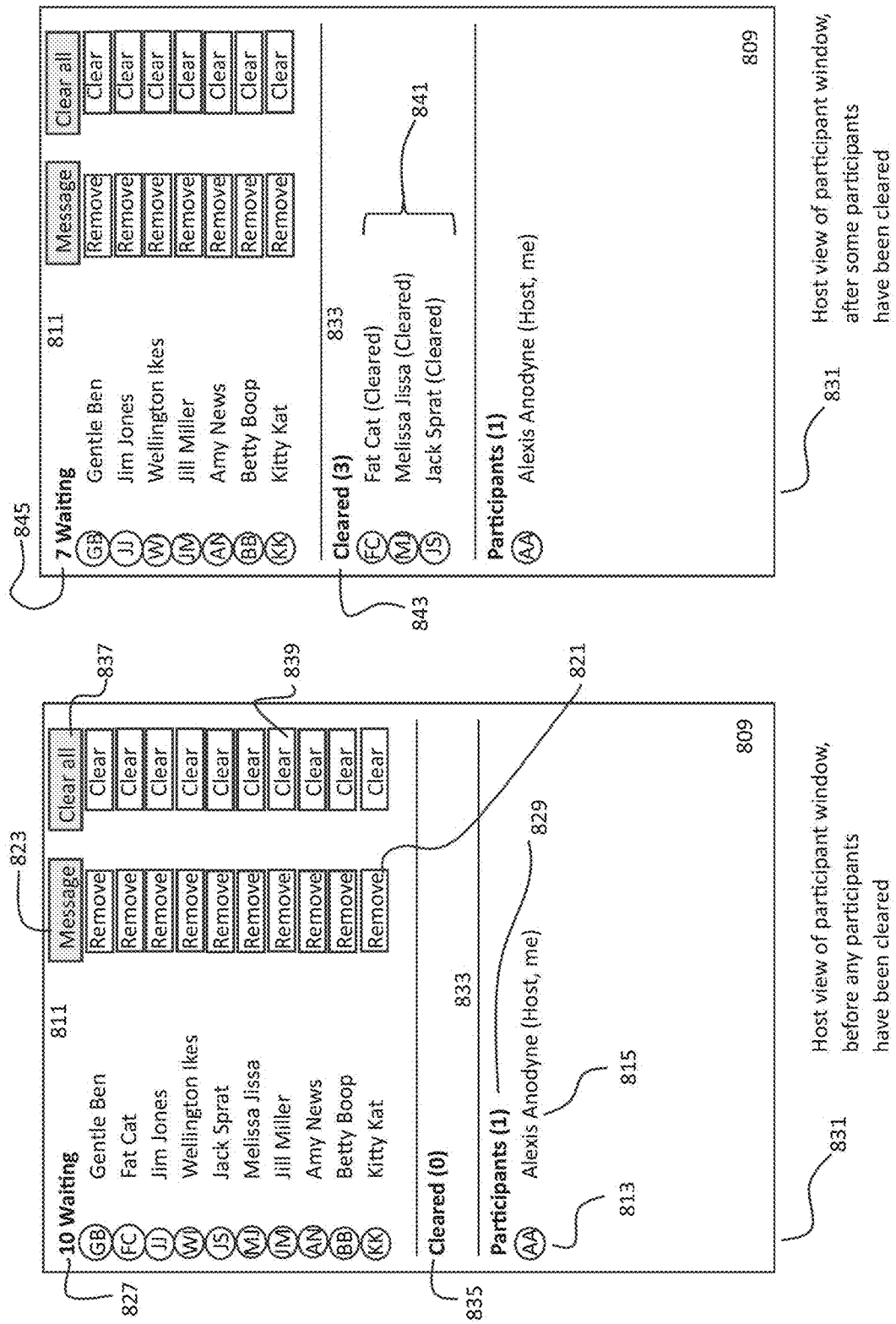

Participant view of Waiting Room

Participant view Waiting Room after participant has been cleared to enter Meeting (and pre-meeting networking session).

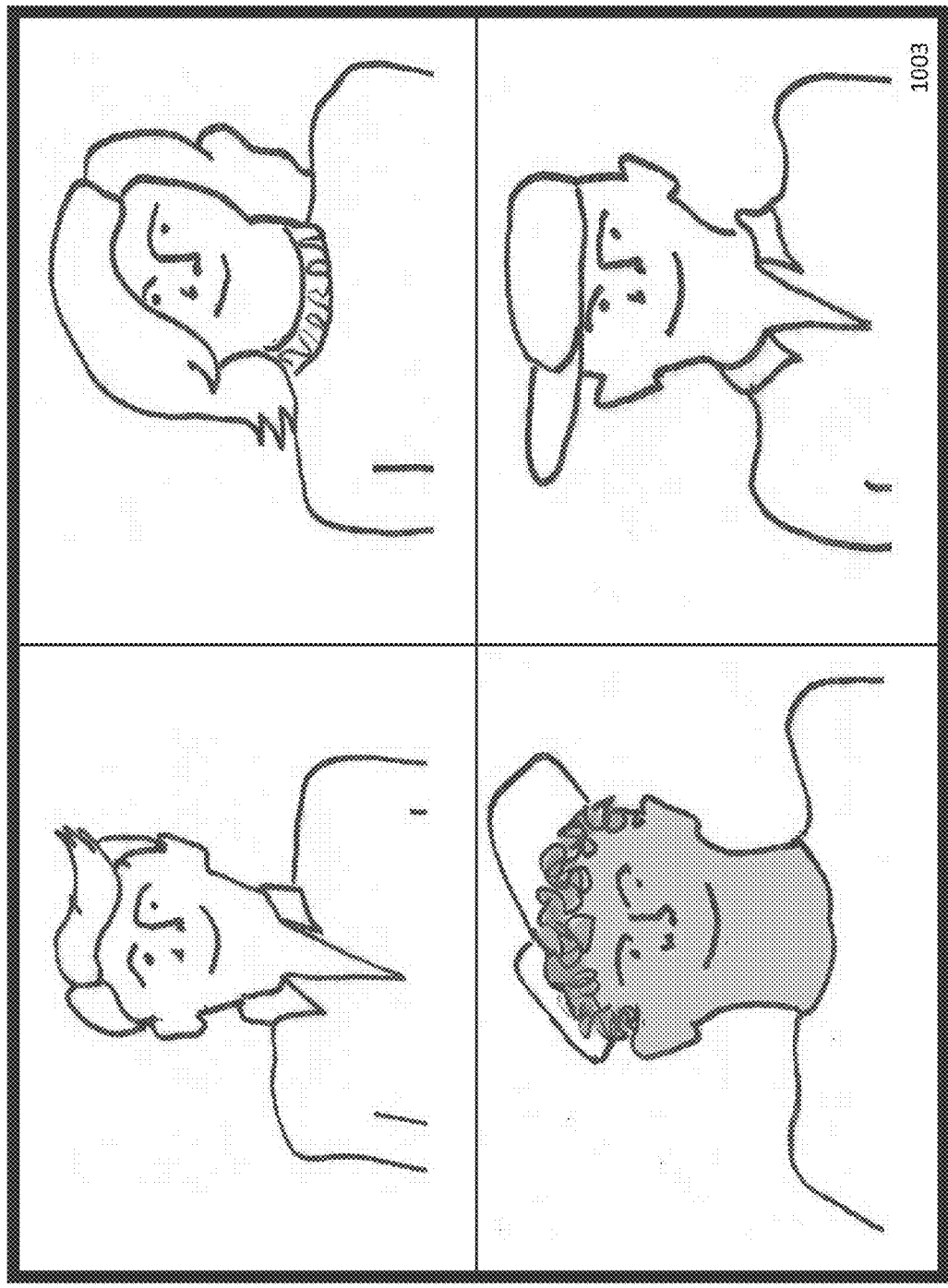
Fig. 10A  Participant view of video chat window of pre-meeting networking session in one gallery view embodiment with algorithmic matching of participants

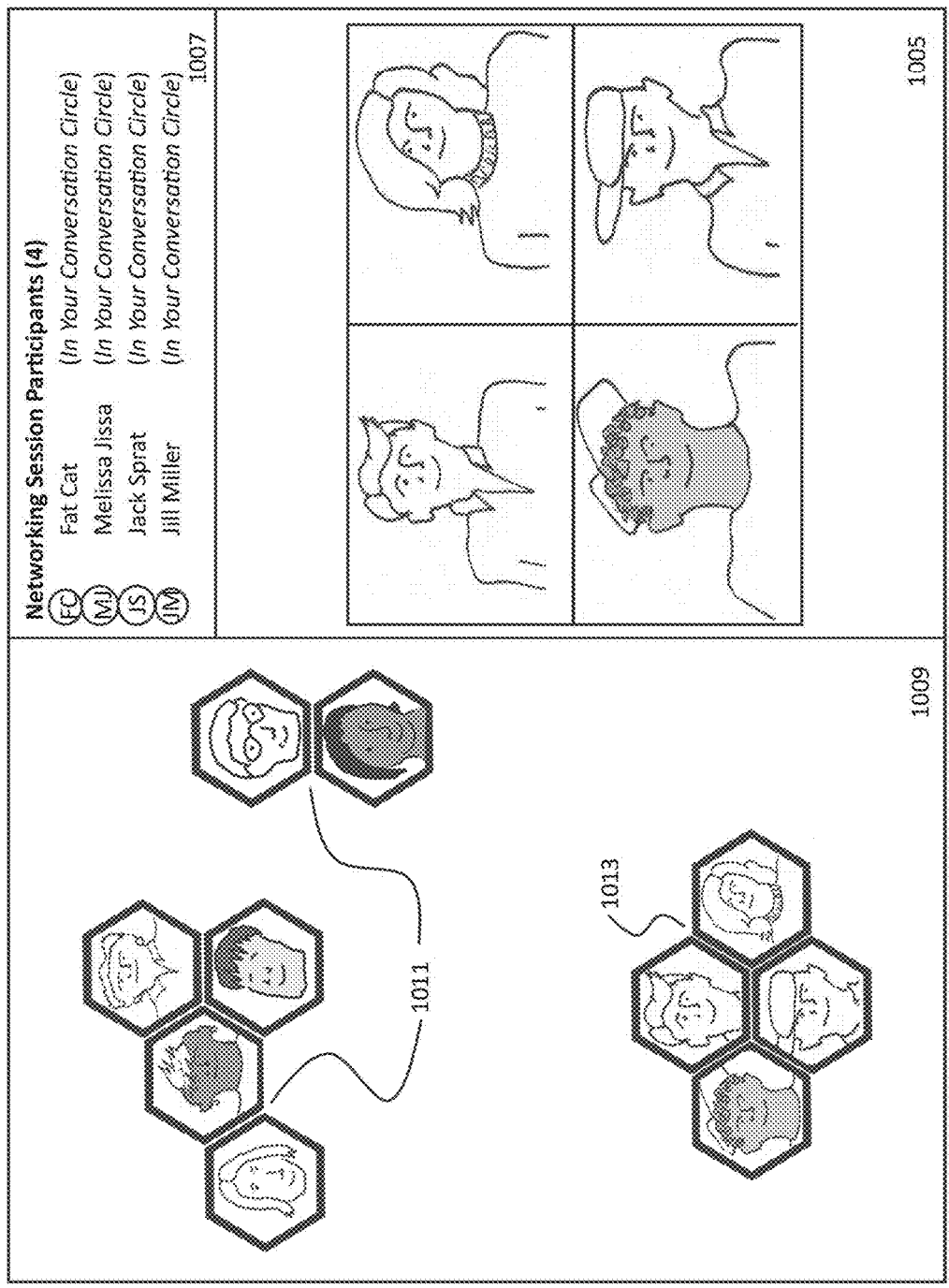
Fig. 10B Participant view of video chat window, spatial view window and participant window of pre-meeting networking session in a spatial view embodiment

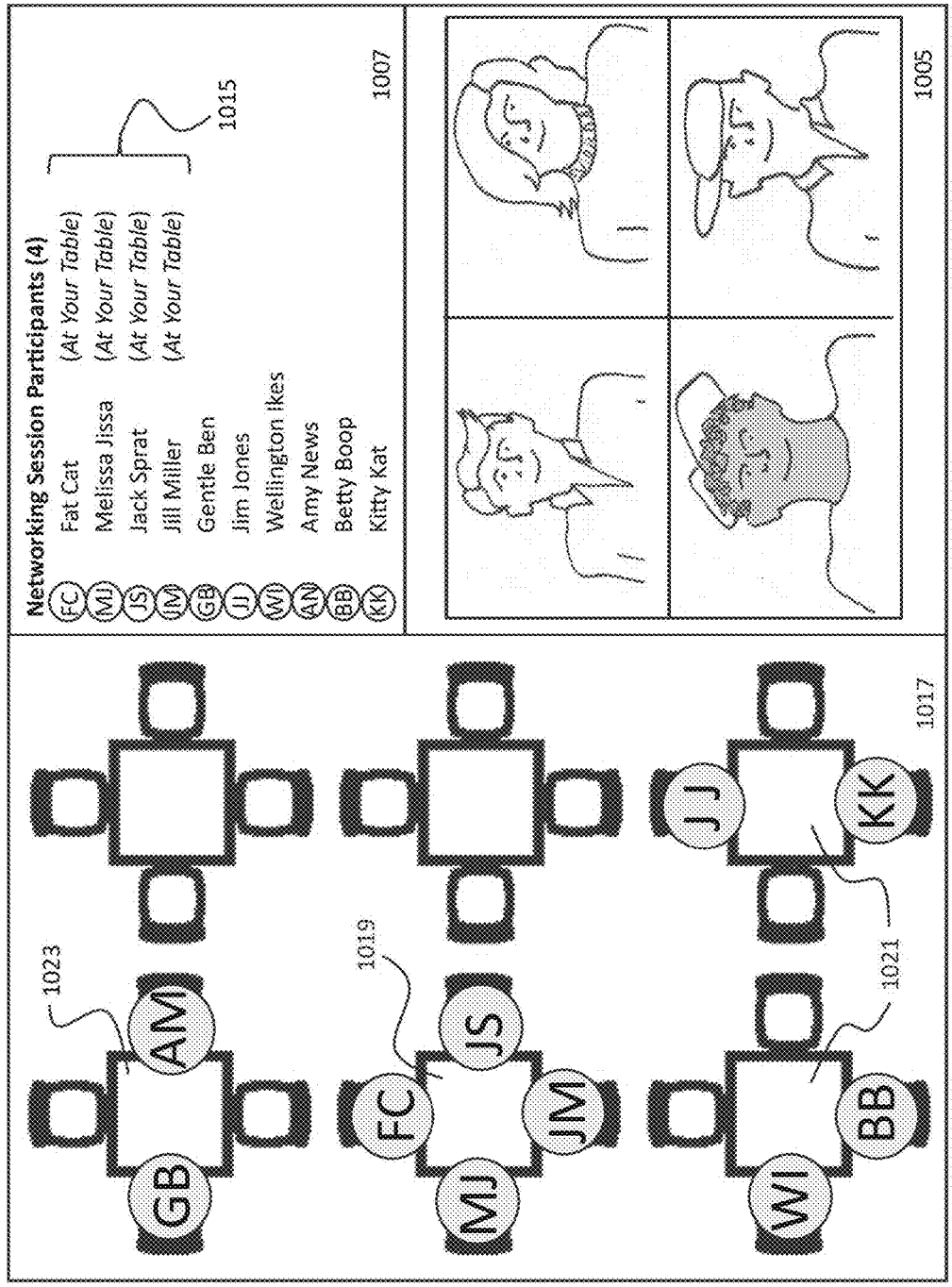
Fig. 10C Participant view of video chat window, restricted spatial view window (with table view) and participant window of pre-meeting networking session in a restricted spatial view embodiment

INTERPERSONAL NETWORKING IN VIRTUAL SPACE PRE-MEETING WAITING ROOMS AND POST-MEETING SESSIONS FOR PARTICIPANTS OF A VIDEOCONFERENCING SESSION

CROSS-REFERENCE TO RELATED APPLICATIONS

This application is a continuation-in-part of copending U.S. Nonprovisional patent application Ser. No. 18/608,181 filed Mar. 18, 2024, which is incorporated by reference herein.

This application claims priority to U.S. Provisional Patent Application No. 63/452,919 filed Mar. 17, 2023 and U.S. Provisional Patent Application No. 63/457,934 filed Apr. 7, 2023, both of which are incorporated by reference herein.

The present application relates to U.S. Pat. No. 11,107,490 (Slotznick); U.S. Pat. No. 11,330,021 (Slotznick); and U.S. Pat. No. 11,282,532 (Slotznick), each of which are incorporated by reference herein, particularly with respect to the description of the architectures of videoconferencing and teleconferencing systems in the '490 patent along with essential components of computing devices that are used to connect to these systems (see, particularly, FIGS. 4 and 5 of the '490 patent and the related discussion, along labeled memory cache (502 and 527) in FIG. 5), and the ability of those systems to distribute and process multiple audio and visual streams, the mirroring feature in the '021 patent; and the participant's ability to control the volume of music in the '532 patent.

The present application also relates to U.S. Pat. No. 11,601,618 (Slotznick), which is incorporated herein by reference, particularly with respect to the description of architectures which incorporate into videoconferencing platforms other systems for streaming events or presenting multiplane camera views. FIG. 1A of '618 is incorporated with minor revision in the present application as FIG. 1.

Each of these four patents are discussed below with respect to selected features which may also be used with the present invention.

BACKGROUND OF THE INVENTION

The general field of this invention is interpersonal networking in the context of virtual queuing and videoconference sessions. Currently, and as discussed below, virtual waiting buffers (a manifestation of queueing) focus on security concerns (such as participant identification) and delivering branded experiences between host and participant. Waiting rooms and buffer areas are designed to not permit discussions between or among participants. Rather this is when the credentials of the participant are checked to see if they are valid, either automatically or manually. Automatic credentialing is sometimes accomplished by the user logging into the meeting from (or displaying identification exhibiting) a pre-approved internet domain. If done manually, a participant remains in the waiting buffer (or waiting room) without the ability to interact with other participants while an administrator, such as the host or co-host, does the credentialing. In contrast, for some in-person, real-world situations such as industry conferences, this type of inter-participant networking is one of the most valuable parts of the event—in part because waiting for a particular event indicates common interests among those waiting, in part because being required to wait together provides chance meetings among people who might not otherwise seek to meet, and in part because the required down-time of a queue provides a low-bar to social conversation in a low-pressure social environment-making conversation easier among strangers (or mere acquaintances). The present invention teaches how such informal participant-to-participant networking can be implemented in virtual events and virtual queues.

Virtual queueing is an aspect of queue management and the management of associated buffers, waiting rooms, and exit buffer zones—for events, interactions, transactions, and meetings, whether in-person or online. When a situation involves waiting—whether to receive or buy something or some service—it is called a queue, and usually involves a waiting area or buffer zone. This can be applied to objects and processes as well as people waiting in line. Queues, wait zones, and buffers can manifest physically, such as when customers wait at a food truck to buy a hamburger, or virtually, such as waiting to be admitted to a website on Black Friday to take advantage of limited amounts of specially-priced products.

The interpersonal networking involved in the present invention refers to the impromptu and spontaneous conversations (and exchange of contact information) between and among people in a queue or buffer zone, as well as the introductions to others (not necessarily in the queue) prompted by these conversations and exchanges. The conversations and introductions may be synchronous and consist of text, audio, or video-chat, or asynchronous via media such as email, text messaging, voice messaging, or video recording.

Some additional background on queueing: Queues form when there is greater demand for something (a service or good) than can be supplied in the unit of time in a production cycle. However, the variability of the demand is a contributing reason for the waiting (or line formation). That is because when demand is variable, the production cycle cannot efficiently be adjusted to always automatically eliminate the queue. For example, a check-out line will grow in a supermarket when the check-out person cannot service customers fast enough. However, too many checkout lines mean that some of them will usually be empty, with check-out people standing idle (i.e., themselves waiting), thereby decreasing efficiency and increasing costs.

As noted above, a queue forms as a buffer while waiting for the service or good to be provided, but in addition to waiting in a line, the waiting can be done in a buffer area or waiting room. The process of queue formation and propagation is defined as queuing theory, considered part of operations research. (See https://en.wikipedia.org/wiki/Queueing_theory.) With some queues, once the customer (or job) is matched to the service, the customer (or job) enters another queue, creating a series of queues. Although less researched, the efficient departure or propagation after receiving a service or good may also involve buffering and buffer zones. (See https://www.sciencedirect.com/science/article/abs/pii/S0925753518317053 on exit buffer zones.)

A major goal of queue management is to reduce actual and perceived wait times and increase the number of customers served and their overall satisfaction. Part of the intent is to complete the consumer transaction and prevent people from dropping out of the line, by balking (deciding not to join the line because it seems too long) or reneging (leaving the line because it is taking too long). Some methods include adjusting a queue's throughput on the fly (automatically opening more checkout lines depending upon sensors that count the people in currently open checkout lines), finding ways to minimize the wait time by making check-out more efficient, providing ways for a customer to do other things while "waiting" (taking a ticket with a number at a deli counter so the customer can leave the line and continue shopping until the number on their ticket is announced), and making the queue itself more enjoyable (Disney World "cast members" entertaining guests who are standing in line for a theme park ride). (See https://en.wikipedia.org/wiki/Queue_management_system.)

Queue management of physical interactions is increasingly using a mobile phone app or a wearable device to establish queues, so that guests don't have to stand in line or be anywhere specific. Rather they are free to wander around the physical site while waiting until notified via the phone or device that it's their turn, that is, that they've reached the front of the line (queue). The app itself can also entertain, or provide opportunities to sell the customer other items. This use is also called "virtual queueing."

Importantly for this disclosure, the term "virtual queueing" has two distinct meanings.

First, the term "virtual queuing" is used when the queue is for a virtual or online service. Consider waiting on the phone for a customer service representative to become available, or waiting for access to a website or mobile app with limited server capacity. Queue-it software, for example (see https://en.wikipedia.org/wiki/Queue-it) creates virtual waiting rooms and queuing solutions for websites and apps. Queue-it solutions prevent website and app traffic peaks from overwhelming and crashing the website or mobile app. In addition, the wait room or wait page can promote future events, upsell additional products, and embed videos or games as customers wait in line to enter the website—while maintaining brand consistency and messaging.

Second, the term "virtual queueing" refers to use of a mobile phone app or a wearable device to manage waiting lines and waiting areas for physical services. These apps function as if the user is given a virtual version of the numbered paper ticket that a customer takes at a deli counter to preserve his or her place in the line in front of the counter. These apps allow those who are waiting to do something else and go somewhere else while waiting.

Queues for virtual and online services are often experienced via a desktop or laptop computer. In that situation, the multi-tasking capabilities of such computers allow people who are waiting in one software application to sometimes continue doing other tasks at the computer (based on other software applications) while they wait.

These two uses of the term "virtual queueing" have functional overlaps. To add clarity to this disclosure, the term "meeting-based" queueing refers to queues and buffers for which the number people in the queue (though it may be substantial) is approximately the same as the number of people cleared in one production cycle of the service, there is only one production cycle, and the buffer clears when the production cycle for the service ends. Meetings are a particular example of this kind of queueing. In contrast, the term "transaction-based" queueing refers to queues and buffers for which the number of people in the queue is greater than the number of people cleared in one production cycle, there are multiple production cycles, and the buffer does not clear when a production cycle ends. One-to-one transactions, such as ticket purchases and shaking hands in a reception line, are examples of this kind of queueing.

Some examples when and where lines form include but are not limited to: bargain sales on Black Friday, free food giveaways, theme park rides, boarding airplanes, getting into a movie at a film festival, attending the opening nights of the latest movie, product launches and releases such as purchasing the latest limited edition Nike sneaker or iPhone, counter service for cookies or sweets, concert tickets, waited for concerts to start, sample sales, book signing, unique novel experiences, reception lines for dignitaries and celebrities, influencer & email marketing campaigns, university admissions, and government applications.

Importantly—and counter-intuitively—some forms of queue creation and management are intended to increase bottlenecks and wait times rather than decrease them.

Consider that creating security check points may require establishing queues and waiting areas. For example, security checks at airports are possible only by lining travelers up and checking them one by one-even though this significantly increases check-in time. Videoconferencing platforms like Zoom® create virtual waiting rooms from which meeting (or webinar) hosts can specifically admit participants to the video meeting or webinar (often one at a time), so that hosts can refuse to admit troublemakers who might disrupt the meeting or webinar (see for example, https://support.zoom.us/hc/en-us/articles/115000332726-Waiting-Room). See also Zoom's "Green Room" process for adding additional security to the queueing process (https://support.zoom.us/hc/en-us/articles/360051861511-Green-Room-Process).

Consider also that queues and wait times provide signals. They signal limited capacity, so that visible waiting lines can signal to a community the popularity or exclusivity of a restaurant, night club, or limited edition of a Nike sneaker. This enables these establishments or businesses to charge more for their services and products. Indeed, the experience of waiting (and anticipation of being served) becomes part of the experience, and is used by those who endured the wait to signal to others (and themselves) that they are part of a special community. Joining and enduring a particular queue can reinforce in the minds of those who are waiting (or demonstrate to others) how fancy, in-the-know, or fashion-forward they are. See for example https://operationsroom.wordpress.com/2014/06/26/do-people-join-a-line-because-it-is-long/or https://www.racked.com/2018/1/17/16897160/lines-waiting-history. The persistent existence of queues at one physical location provides an incentive for other services to co-locate there or nearby to take advantage of the crowds.

Current management of virtual queueing is designed to reinforce a one-to-one relationship between the consumer in the queue and the brand, product, or service for which the consumer is waiting in line. (See for example https://blog.timify.com/control-waiting-lines-with-queue-management-systems/.) Queue-it calls this "Branding the wait" (https://queue-it.com/queuing-software) and exhorts businesses to use virtual queues to "promote future events, upsell additional products, and embed videos or games as your customers are waiting in line to enter your website, all in your brand's tone, messaging, and style." See also features available in the virtual waiting rooms that Zoom has designed for its videoconferencing meetings (https://support.zoom.us/hc/en-us/articles/115000332726-Waiting-Room).

In contrast, standing in a physical line offers an opportunity for serendipitous social interactions among individuals who are in the queue, notably when the queue is part of a special experience that helps define a special community. Examples include waiting in line for drinks at a college reunion, having fun at a pre-game tailgate party, waiting in line to be admitted to a rock concert, waiting in line to buy the latest iPhone, standing around an in-person registration desk at an industry conference, or waiting in one room for the presenter to arrive at an industry conference where there are many simultaneous presentations in many different rooms. Similar chance social interactions occur in the session room and adjoining hallway after such presentations. These unplanned social interactions add to the enjoyment and value of the experience. They are the primary reason why some people attend the event. They are currently not possible or greatly restricted at virtual events and on videoconferencing platforms.

There are a number of different videoconferencing platforms, with varying features-even different platform paradigms. These include, but are not limited to, Zoom, Microsoft Teams, Skype, Intermedia Unite® and AnyMeeting®, Cisco Webex® Meetings, ClickMeeting®, Google MeetTM, Slack®, Zoho Meeting, and Join.Me®. Open source versions include Jitsi. Others include Tecoh, Wonder, Gatherly and Flymachine. One paradigm for displaying the user video feed (or avatar) of the person who is speaking is to have this person's video feed fill (or nearly fill) the computer screen (or the window of the videoconferencing software application that is running on the computer)—this is usually referred to as "speaker view." Another paradigm is to display the video feeds (or avatars) of everyone in the meeting in a more equal grid-like configuration on the computer screen—usually in squares or rectangles, and usually referred to as "gallery view". Still another paradigm is to display the video feeds (or avatars) as if they were objects in a virtual space, where users can reposition their video feeds (or avatars) and when some are in proximity with each other in that virtual space (an epsilon distance) the platform aggregates those proximate users into a "conversation circle" or group, and allows such proximate users to hear each other (whereas other users who are not proximate cannot hear the audio from members of this group, or cannot hear it as well)—referred to herein as a "spatial view." (Because people can easily move around in this virtual space, and make connections, platforms based on a spatial view are sometimes referred to as "online social platforms".) Still other platforms provide a restricted spatial view, which shows a set of tables, each with a specific number of seats around it. The platform instantiates a conversation group (videoconferencing breakout room) for each table for those sitting at that table. When a participant clicks on (or navigates to) a seat at a table, the participant's avatar is displayed at the seat (so that other participants at the table can see who is there), and the participant enters the table's breakout room. Similarly, instead of tables, the platform may show other seating configurations, such as rows of seats in auditorium style seating, with each table or row constituting a breakout group. In the discussion below these specialized restricted spatial views may be referred to as seating views, table views, or row views.

Some platforms, such as but not limited to Zoom, Microsoft Teams, Jitsi and Google Meet, primarily rely on speaker view and gallery view. Breakout rooms are primarily organized by lists: lists of participants and lists of the breakout rooms they may enter or be assigned to. For ease of discussion, such videoconferencing platforms will at times be referred to as "Zoom-like". In contrast, other platforms, such as but not limited to Wonder, Gatherly, and Flymachine primarily rely upon a spatial view, supplemented by a gallery view and speaker view. For platforms focused on presenting a spatial view, breakout rooms are primarily organized by proximity-based conversation circles. (Gatherly also calls these "huddles".) Of course, to be successful, most platforms try to implement versions of those features found successful on other platforms, whether or not originally based on gallery view or spatial view.

However, the flow of people into and out of meetings, breakout rooms, and conversations, is significantly different between platforms based on a spatial view and those Zoom-like platforms more focused on a gallery view.

Different videoconferencing platforms have different approaches to managing their meetings, breakout sessions, "backstage" areas, and waiting rooms. For example, Zoom-like videoconferencing platforms have a more top-down approach to starting and managing their virtual spaces than spatial view "social" platforms. Spatial-view platforms are more bottom-up, and rely primarily upon participant self-organization to start conversation circles which function much like breakout rooms. Zoom-like platforms rely upon a "host" (a person with administrative privileges for the videoconferencing session) to operate and administer video conferencing sessions, including not only starting them, but often moving attendees and participants from one breakout session to another, or from one virtual space to another. For this reason, Zoom-like platforms tend to focus on more formal "meetings" and "presentations" where only one person is supposed to talk at a time.

This focus, on conference formats conducive to only one-person talking at a time, has informed the noise suppression efforts of Zoom-like videoconferencing platforms. Indeed, they, and many other videoconferencing platforms, have suppressed audio background noise (and noisy feedback loops) in part by allowing the audio from only one user at a time to be heard. This approach to audio has made casual interpersonal networking at the beginning or ending of a meeting difficult, especially if there are more than a handful of people in the virtual space.

Some attempts to permit a limited amount of interpersonal networking have included opening (starting) a meeting a few minutes before the appointed start time; then allowing attendees to at least say "Hi" or "Hello", or wave a greeting. Alternatively, the meeting begins on time, but the presenter intentionally starts a few moments late, so that attendees can greet each other. Similarly, the meeting can be kept open after a speaker has finished for attendees to say "Goodbye". (When Zoom has been used for religious services, this after-service parting, can be used for expressions of well wishes and peace.) However, the one-speaker-at-a-time "rule" or convention makes multiple one-on-one interactions extremely difficult if not impossible. See also the Zoom "Backstage" feature for webinars that enables panelists (but only the panelists) to talk amongst each other both before and after a webinar (https://support.zoom.us/hc/en-us/articles/4710061514381). Just as Zoom's Backstage adds a private meeting after a meeting, see Zoom's "green room" process mentioned above, for adding a meeting with limited text-based networking before a meeting. Compare these features to Zoom's option for opening a meeting directly to participants (without having a waiting room), then automatically moving all participants into a waiting room when the host joins. The host then decides to re-admit participants to the meeting. Notice that this does not solve the pre-meeting networking constraint of one-speaker-at-a-time to facilitate audio processing.

Some hosts on Zoom-like platforms have used breakout sessions as an opportunity for pre-meeting and post-meeting interactions among multiple small groups. Though breakout sessions can be timed, and grouping of participants can be randomized (at least on Zoom), serial use of breakout sessions must be actively managed and manually started. Participants can be assigned to breakout rooms, but that is a time-consuming process whether before or during a meeting. There had been no easy platform-based way to create a serial set of breakout sessions with participants grouped dynamically by profile attributes.

To be clear, pre-meeting or pre-session interactions (including pre-meeting networking at a pre-meeting networking session) are those that occur prior to the start of a scheduled meeting or session among participants who intend to attend that scheduled meeting or session, but arrive (or log in) early to the meeting or session, before the meeting or session is scheduled to begin. A pre-meeting time-window is a time period prior to the scheduled start or initiation of a meeting or session, which serves as a waiting buffer, and during which time period the waiting room is open and pre-meeting networking sessions can occur. Initiation of a scheduled meeting refers to the time at which the meeting starts, commences, or is begun.

Likewise, post-meeting or post-session interactions (including post-meeting networking at a post-meeting networking session) are those that occur after the scheduled end of a meeting or session, among participants who attended that scheduled meeting or session, and wish to continue discussions or exchanges. A post-meeting time-window is a time period after the scheduled end of a meeting or session, which serves as a waiting buffer, and during which time period post-meeting networking sessions can occur.

Because this disclosure is concerned with time-windows with respect to the time for which meetings are scheduled to begin or end, it will refer to such scheduled meetings as host-scheduled, as in host-scheduled meetings, host-scheduled sessions, and host-scheduled videoconferencing meetings, and host-scheduled videoconferencing sessions.

While much of this disclosure and its illustrative figures references and focuses on video-chat interactions, the disclosure and its inventive features are also intended to cover audio only interactions as well as text-chat interactions—and the online meeting user interfaces which support them. The methods of extending platforms which support video-chat to ones supporting audio-only chat and text-chat are well known to those skilled in the art.

Competing videoconferencing platforms do not share direct simultaneous access to a user's webcam. For that reason, switching between videoconferencing applications—so that one application runs the meeting and another runs pre- and post-meeting networking sessions—is not currently practiced. Switching between platforms is not encouraged by videoconferencing companies who are each still trying to dominate the industry. Rather videoconferencing platforms encourage accessory applications to work within the platform. For example, Twine (discussed below) has an application that works within Zoom and is available from Zoom's app store. (An early version of Twine's Zoom app was created by Glimpse, which was purchased by Twine.) Technically though, such switching can be done by having virtual cameras connect to multiple programs which each transmit the webcam's video feed. An example of a virtual camera that acts as a video-feed splitter is SplitCam (for review see https://www.softwareadvice.com/livestreaming/splitcam-profile/).

Another approach to interpersonal networking can be found in connectivity software, such as Twine or Chatroulette, which are designed to randomly connect users for video-chat. While Chatroulette is a stand-alone chat website, Twine works not only through its website, but also in conjunction with other platforms. (For more information on Chatroulette, see https://en.wikipedia.org/wiki/Chatroulette.)

For example, Twine (https://www.twine.us/) seeks to restore some serendipity to virtual breakout and speed networking experiences. Twine is designed for use on Zoom, Slack, or the web. Twine's basic paradigm involves inviting a known set of participants, such as participants in a specific Slack channel or members of a distributed team, to join a video conferencing session via a URL (hyperlink). During the course of the session, Twine creates timed rounds of one-on-one or small group video-chat sessions. The Twine software can automatically create the conversation groups randomly or via algorithm based on pre-chosen criteria. Twine also can be used to create timed rounds of breakout sessions from the specific participants in a Zoom meeting—that is, a series of timed video-chat sessions that are started, stopped, and managed automatically. In some implementations, participants can use a "map" of a virtual space, allowing participants to pick with whom they want to video-chat. The organizer of a Twine session can also use Twine to pose conversation starter questions (sometimes called icebreakers) for the participants. At the end of the session, Twine provides built-in ways for the participants to provide feedback or share contact information. Notice that despite Twine's introduction of random or algorithmic matchmaking, the networking process is still formal and intentional on the part of session organizers and participants-rather than casual or spontaneous.

As mentioned above, in a variety of situations, in-person queues and exit buffers provide unique and valuable opportunities for person-to-person networking, where important interpersonal connections can be made or developed, and where personal networks can be broadened by introductions to others. In some cases, the chance for networking is as important as any service or good delivered. For example, the business connections made at a trade show or industry conference are as important as the information gathered at keynotes and presentations. Those waiting for a particular breakout presentation to begin already have much in common-having preselected themselves by waiting for this particular presentation-so networking interactions are likely to be more natural, relevant, and productive. The same is true at college reunions. Consider also the pre-game (and post-game) tailgating festivities at football games or the pre-game conversations at a sports watch party. Even waiting in line at a particular night club or rock concert-compared to choosing other entertainment to wait for-offers important self-selection and signaling for matchmaking purposes. In all these instances, those doing the waiting together, already have much in common.

However, the casual person-to-person networking interactions found in physical waiting areas are not possible when waiting in virtual buffers for similar events. The present invention remedies that.

SUMMARY OF THE INVENTION

The present invention teaches how to create a videoconferencing platform that structures its queues, waiting rooms and exit buffers to accommodate interpersonal networking through connectivity software (such as Twine) and participant initiated breakouts and sidebar conversations (such as U.S. Pat. No. 11,343,293 or 11,444,990 by Slotznick). Such accommodations allow those in the buffer areas to engage in video-chat with each other, exchange contact information, and arrange introductions for those they meet (in the buffer) with their other contacts who might not be present. The present invention also teaches methods for creating and structuring these networking sessions, sidebar conversations, and introductions.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, embodiments which are presently preferred. It should be understood, however, that the invention is not limited to the precise arrangements and instrumentalities shown. In the drawings:

FIG. 1 is a schematic view of the generalized systemic information flows involved in a videoconferencing platform enabling interactive videoconferencing session or presenting a live event to an interacting audience.

FIG. 2A shows a timeline with respect to the sequence of participants entering and exiting a meeting, gathering, or transaction space, for which there is not an entrance buffer or exit buffer.

FIG. 7B is a continuation of the processes initiated in FIG. 7A, FIG. 7C, or FIG. 7D.

FIG. 8B is a generalized picture showing the participant window on the host's computer screen when the host is using the present invention. This is after the waiting room is open, but prior to the start of the meeting itself, and prior to the host clearing any potential participants for the meeting itself or the pre-meeting networking session.

FIG. 8C is a generalized picture showing the participant window on the host's computer screen when the host is using the present invention, a short time after the picture shown in FIG. 8B. This is after the host has cleared some potential participants, but not all of them, and prior to the start of the meeting itself.

FIG. 10A is a generalized picture showing the screen of a participant in a preferred embodiment of a pre-meeting networking session.

FIG. 10B is a generalized picture showing the screen of a participant in an alternative embodiment of a pre-meeting networking session.

FIG. 10C is a generalized picture showing the screen of a participant in another alternative embodiment of a pre-meeting networking session.

DETAILED DESCRIPTION OF PREFERRED EMBODIMENTS

Certain terminology is used herein for convenience only and is not to be taken as a limitation on the present invention. The words "a" and "an", as used in the claims and in the corresponding portions of the specification, mean "at least one."

The present invention involves virtual interpersonal networking via video-chat, in the context of videoconferencing and telephony platforms. As an overview of these platforms, consider FIG. 1 which shows the information flows in a generalized videoconferencing platform, 105, with a number of participants. Without loss of generality, only four of the participants are enumerated (111, 113, 115, and 119). The participants are able to share live audio and video of each other (that is, they can see and hear each other electronically). At the same time, the videoconferencing system is capable of providing a live stream of an event (103) to these participants in a separate and distinctly displayed, channel. (This is a special instance of the generalized videoconferencing systems discussed in U.S. Pat. No. 11,107,490

Figure 4:
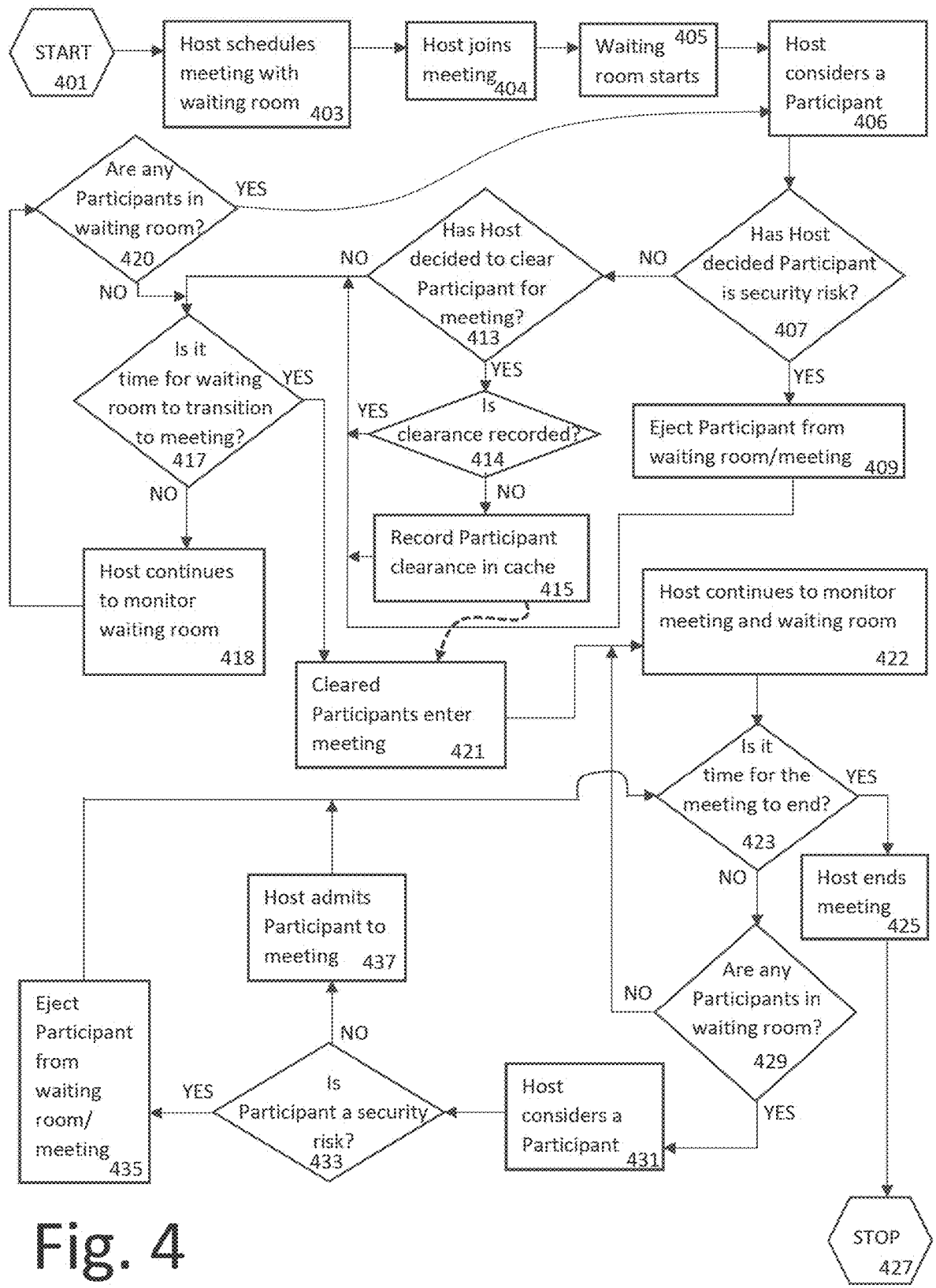
FIG. 4 Is a flow chart with respect to a host's management of a pre-meeting and post-meeting networking sessions created in conjunction with a meeting and its virtual waiting room and virtual exit buffer.
Figure 5:
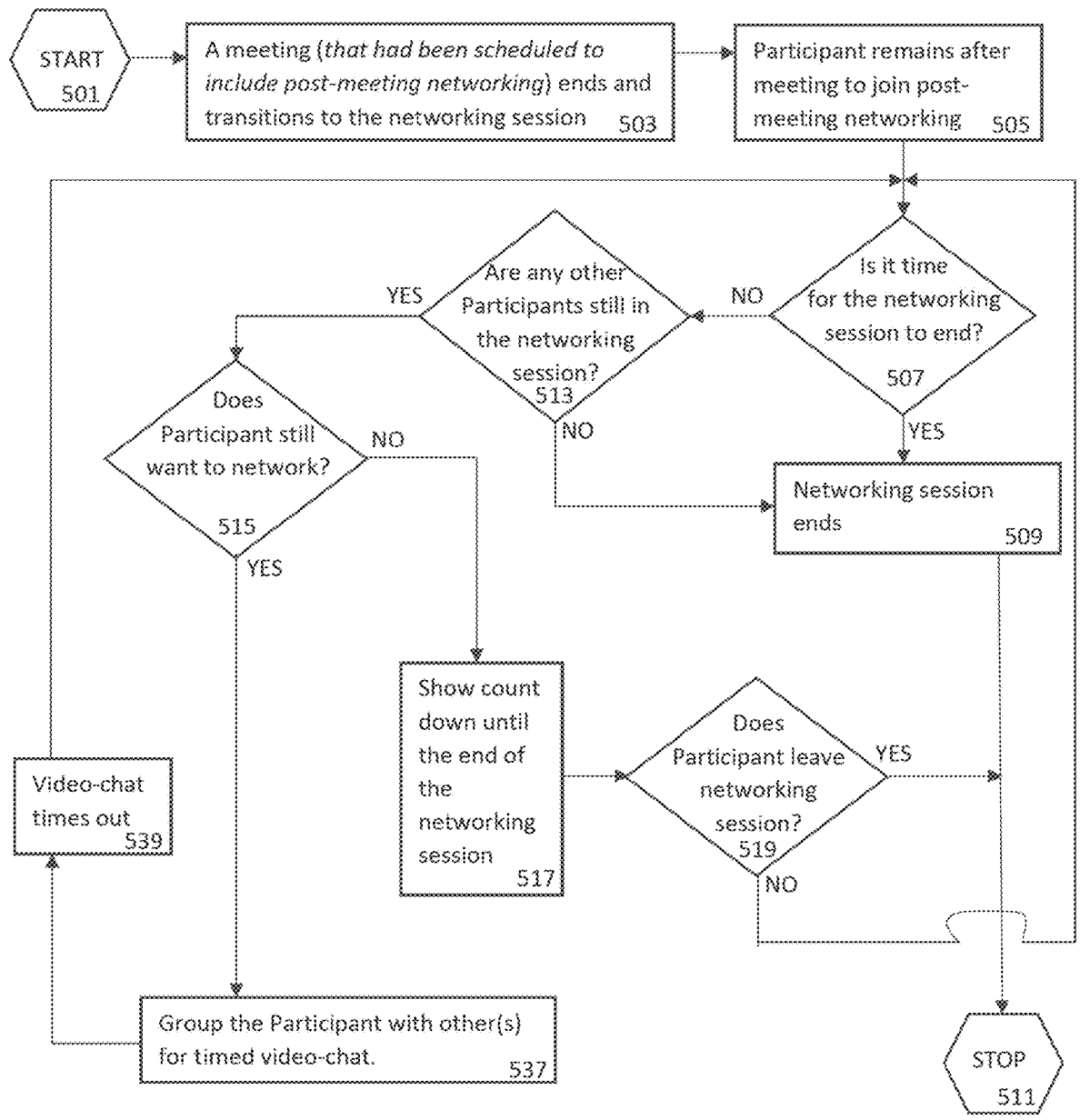
FIG. 5 is a flow chart with respect to a person's participation in a virtual interpersonal post-meeting networking session created in conjunction with a meeting or transaction space.

(Slotznick) with respect to FIG. 4 and FIG. 5 of this patent, which are incorporated herein by reference.)

The participant video subsystem, 109, of the videoconferencing platform, 105, is sending copies of each participant video to every other participant. (Note, to conserve bandwidth, some videoconferencing platforms do not send the video of a particular participant back to that participant from 109. Instead, a copy of the video produced by that participant's video camera or webcam—copied by the participant's computer—is displayed on that participant's own screen.) The videoconferencing system (whether spoke-and-hub or peer-to-peer) also transmits audio, as well as text messages, emojis, and control messages that it has received, back to all participants.

In addition, the platform shown in FIG. 1, is capable of streaming live video from a live event, 103, via its own separate stream through the videoconferencing platform, 105, via the transmission system, 101, to the virtual livestream subsystem, 107. For some platforms, this livestream is sent, as is, through the transmission system, 101, to the videoconference participants, 111, 113, 115, and 119. At each participant's computer, the videoconferencing system displays the live stream and participant videos, in various ways.

Alternatively, operators of the systems have several different camera operators at the live event, 103. Each camera sends a live video feed to a livestream control subsystem. Using the livestream control subsystem, a webcast engineer, 123 (similar to a broadcast engineer), chooses which video stream to send out to participants (111, 113, 115, 119). The webcast engineer (or team of webcast engineers which may be in one location or distributed among a number of locations) has the ability to switch streams by using cross-fade effects, add other special effects, or even overlay the streams. Some event producers locate the livestream control subsystem at the live event location, 103. Others locate it within the videoconferencing platform, 107, or even elsewhere such as on the webcast engineer's computer (123) or an auxiliary studio (121). For example, a number of consulting studios offer remote webcast engineer services for multi-camera church service livestreaming.

The two-way information runs from the participant video subsystem (109) through the transmission system (101), to the individual participants (111, 113, 115, 119). This is shown in FIG. 1 as thick single lines with arrow heads going both directions.

The one-way information flows from the livestream video subsystem (107) to the individual participants are shown in FIG. 1 as a thin multi-headed but one-way arrow, carrying livestream information from 107 to each participant (111, 113, 115, 119) via the transmission system (101).

The participant video subsystem (109) of the videoconferencing platform (105) receives the webcam video by way of the transmission system (101). The videoconferencing platform processes the received images (in ways depending on the platform), before transmitting those videos to other participants. The participant video subsystem (109) then transmits the video streams received from each participant through the transmissions system (101) to all of the participants (e.g. 111, 113, 115 and 119 in FIG. 1).

Videoconference systems generally allow individual participants to decide whether to display group text-chat, participant lists, question and answer postings, and other matters. They sometimes allow participants to decide how and where such information is displayed, for example, within the application window, in a pop-out window, or on a second computer screen. Different videoconference platforms allow participants different types of control over the display of the image and non-image data.

Figure 2B:
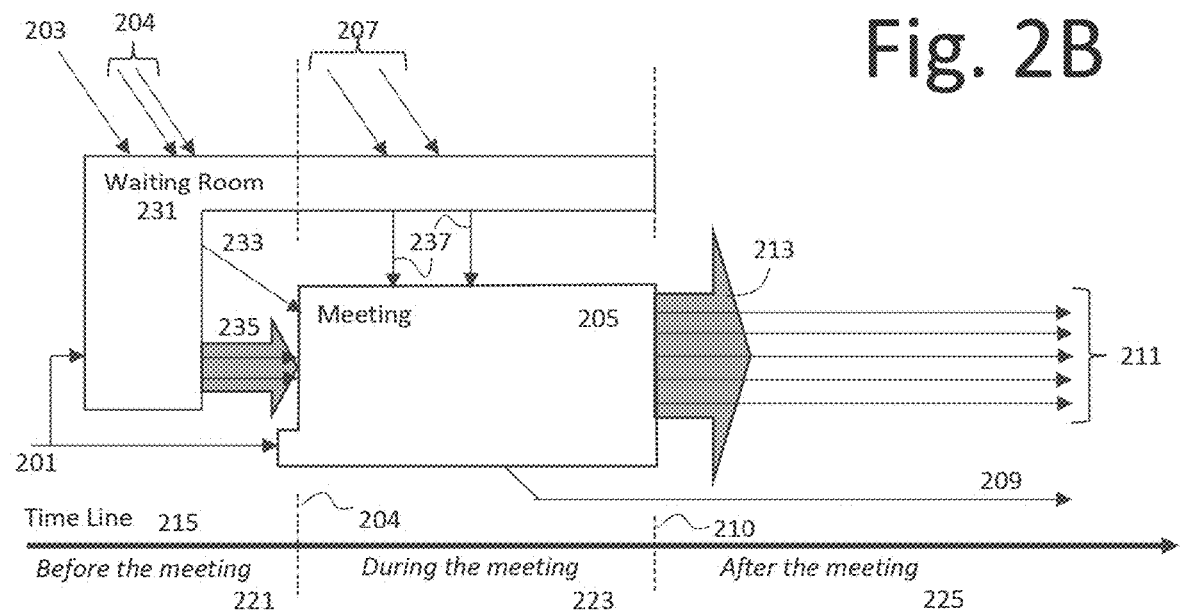
FIG. 2B shows a timeline for a meeting, gathering or transaction space, which includes a pre-meeting waiting room (or entrance buffer) but no exit buffer, showing the sequence of participants entering and exiting the waiting room and the meeting itself.
Figure 2C:
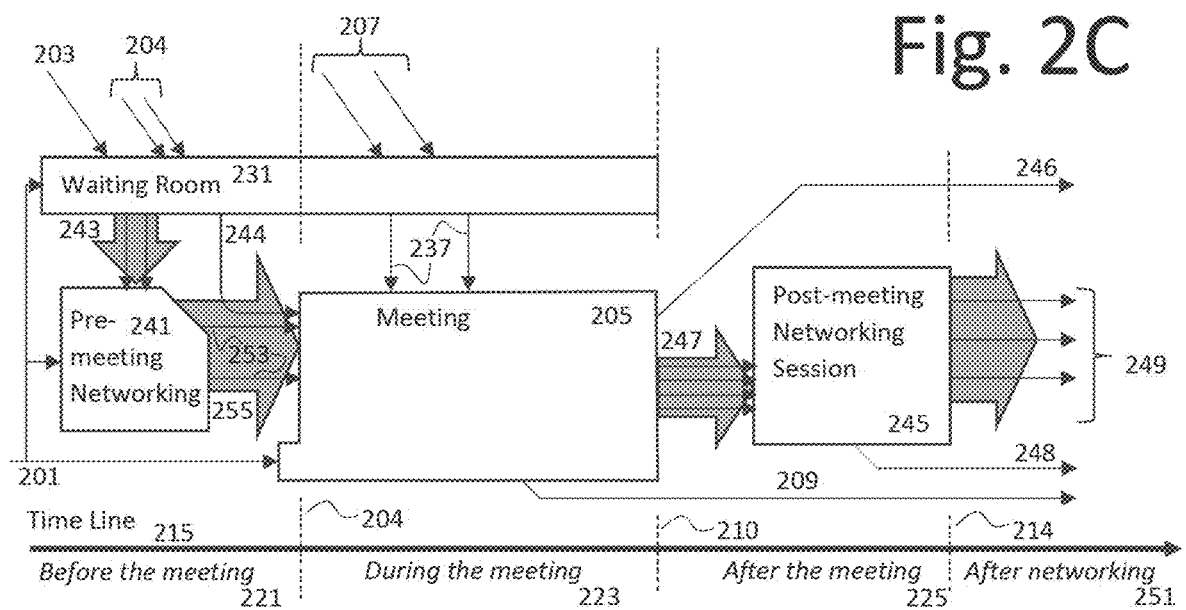
FIG. 2C shows a timeline for a preferred embodiment of the present invention which includes a meeting or gathering, with an associated entrance buffer, pre-meeting networking session, and post-meeting networking session (the latter within an exit buffer).

The present invention involves virtual networking in virtual queues and virtual waiting buffers-whether the meeting, service, or transaction that is being waited for occurs in physical space (e.g., a theme park ride) or virtually (a Zoom webinar). Consequently, the present invention operates within the context of the flow of people (participants) through a meeting or transaction—with and without entry and exit buffers. FIG. 2A, FIG. 2B, and FIG. 2C explore the differences among these scenarios—and how the present invention differs from prior art.

Consider first FIG. 2A, which shows how people currently (i.e., prior art) flow into and out of a meeting or transaction that does not have a waiting room, entrance area, or exit buffer. Examine timeline 215, which shows the time periods before the meeting (221), during the meeting (223), and after the meeting (225). The meeting starts at time 204 and ends at time 210.

One difference between meetings and many other transactions is that multiple people can be serviced by the same meeting, whereas some transactions (such as a single supermarket checkout line) can service only one person at a time. Another difference is that people can often join or enter a meeting (physical or virtual) part way through the meeting, whereas, in contrast, for many other transactions (e.g., a theme park ride) people cannot enter or board in the middle of it, while it's operating. Still another difference is that the queue for a meeting is similar in size to the meeting itself (that is, about as many people wait in the queue to enter a meeting as the number of people who attend the meeting), whereas the queue for a transaction, such as a point of sale or a theme park ride, may comprise many more people than can be accommodated at one time by the service itself. Nonetheless, this disclosure will first discuss the present invention in the context of meetings and their queues (meeting-based queues and buffers), and then address other kinds of transactions and their queues (transaction-based queues and buffers).

Returning now to FIG. 2A. One person 201 (referred to as the "host" herein, as well as on many videoconferencing platforms), has to open the meeting room 205. This is true of both physical meetings and virtual online meetings, though for a hybrid meeting, the host would have to open both the physical meeting room and the virtual meeting room. (For other transactions, the term operator, or manager would be more appropriate than host.) The same is true of any store, shop, or transaction space, whether physical or virtual. After the host opens the meeting room, the meeting will start at time 204, when a second person 203 enters the meeting space 205.

The meeting 205 ends at time 214 when the host 201 closes the meeting space and ushers people "out the door", whether virtual or physical. During the course of the meeting, 223, some people may enter, 207, and some people may exit. (Without loss of generality, only one person, 209, is shown exiting this meeting 205.) When the meeting is ended or closed, that action, 213, releases participants, 211, from the meeting, and they are able to pursue other activities.

As a contrast, consider FIG. 2B showing how people enter and leave a meeting (or transaction space) with a separate waiting room or entry buffer. (This is different than the scenario discussed above, in which participants may enter a meeting room before the presenter, and just wait in the room until the presenter arrives.) Again, timeline 215 shows the time periods before the meeting (221), during the meeting (223), and after the meeting (225). The meeting starts at time 204 and ends at time 210.

Transaction-based queueing, that is, virtual queueing in which the number of participants in the waiting buffer is more than can be serviced at one time in the transaction or meeting, will be discussed in detail in conjunction with FIG. 6. Such queues frequently persist for longer than a single meeting or transaction. For example, the queue for an amusement park ride (or exclusive restaurant) lasts longer (though with different people) than the ride itself (or the meal itself), and the queue for a "back-stage" online video-chat with a rock star provided by services such as Flymachine lasts longer (though with different fans) than any individual video-chat. Similarly, even though it may occur at the end of a meeting, the queue to speak with a meeting presenter is often transaction-based, and more akin to speaking with a rock star than networking with other meeting attendees.

Returning to FIG. 2B. The host 201 has to open the waiting room, 231, as well as the meeting room 205. In the FIG. 2B scenario, everyone has to enter the waiting room, 231, before entering the meeting, 205—and in addition, the host, 201, has to explicitly permit a participant to transit (or transition) from the waiting room to the meeting room. Physically, think of the waiting room at a doctor's office. Virtually, think of a videoconferencing waiting room. (Note that in other possible scenarios, people can bypass the waiting room; in others people can move from the waiting room to the meeting room at will, after entering the waiting room. However, there is virtual queueing only when people must remain in the waiting buffer.)

Note also that in this scenario, the meeting does not start when another person, 203, enters the waiting room, 231. The meeting only starts when the host, 201, admits someone to the meeting room, 205. During the time that the waiting room is open, some people (such as 203 and 204) may enter the waiting room before the meeting begins at 204. If the waiting room remains open during the meeting (perhaps for security or privacy reasons, as with Zoom videoconferencing virtual waiting rooms or a law firm's physical waiting room), other people (such as 207) may join the waiting room during the meeting. In any event, the waiting room, 231, closes no later than time 210, when the meeting, 205, closes.

After the host opens the meeting room, the meeting starts at time 204, when at least one other person enters the meeting space 205. In this scenario, non-host participants cannot join the meeting space at will, but must be admitted by the host from the waiting room. The host may admit people one-by-one, as with 233, or the host may admit the remaining people in the waiting room, as with 235.

The host may prevent some people from entering the meeting at all, because they were not invited to the meeting, or because they are known to have caused trouble at a previous meeting. Otherwise, at or near the beginning of the meeting, the host will admit everyone in the waiting room not intended to be excluded. For a videoconferencing example, the Zoom platform currently allows the host to admit people from the waiting room to the meeting one-by-one, or all at once (https://support.zoom.us/hc/en-us/articles/4905283822733-Enabling-and-customizing-the-Waiting-Room). See discussion below concerning Zoom's "remove" and "admit" controls.

Additionally, Zoom allows the host to designate other people from his or her company (or select web domain names) to bypass the waiting room. However, Zoom does not currently allow a host to schedule a group of people to be automatically admitted from the waiting room to a meeting room at a future pre-set time. Of course, with a physical meeting and physical waiting area or queue, an attendant could admit a select group of people (such as the first-class passengers being called to board an airplane).

During the course of the meeting, 223, others (207) may join the waiting room, 231. (In the scenario of FIG. 2B, no one except the host, 201, can join the meeting directly.) Furthermore, during the course of the meeting, 223, the host (201) may admit these others (237) from the waiting room (231) to the meeting space (205). Also, some people (such as 209) may leave the meeting.

Again, the meeting, 205, ends at time, 210, when the host, 201, closes the meeting space and ushers people "out the door", whether virtual or physical. When the meeting is ended or closed, that action, 213, releases participants, 211, from the meeting, and they are able to pursue other activities.

FIG. 2B can also be used to describe a physical in-person meeting. However, people can usually talk to each other and have social interactions while in a physical waiting room 205, queue, or waiting area. (Notice however, that social conventions may inhibit, if not preclude, people from talking to each other in some situations, such as in a doctor's waiting room.) Likewise, because people are in physical proximity when an in-person physical meeting lets out, they can also talk to each other in most physical exit buffers. (Consider when an in-person seminar or presentation ends; attendees can usually talk to each other as they exit the room. However, in some circumstances such as academic tests or solemn funerals, talking is not permitted or may socially be frowned upon in the exit queue itself.)

Currently (prior art), with Zoom-like videoconferencing platforms, participants cannot talk to each other in the virtual waiting area before the meeting—or after the host ends the meeting. (Zoom and Google Meet call the pre-meeting buffer area a waiting room. Microsoft teams has a similar feature called a lobby.)

Contrast this with the event flow in spatial view videoconferencing platforms. They work differently than Zoom-like platforms, so waiting rooms are used differently, if at all. In some sense, a spatial view event itself is a lobby or waiting area, in which participants self-form conversation circles (or breakout groups) by moving their avatars close to each other, and presentations can be made to those in a conversation circle, those in one area of the virtual space, or broadcast to all attendees. Gatherly does not seem to use waiting rooms at all. Wonder uses the term "waiting room" to refer to a virtual overflow space when more than 500 people attend an event. Excess attendees can still watch any video broadcast to all attendees, and can still text-chat with any other attendee at the event (whether or not in the waiting room). They just can't video chat with other attendees (https://help.wonder.me/en/articles/5775824-the-waiting-room). Flymachine has a waiting room only for one-on-one video-chats with presenter/performers (https://support.flymachine.com/support/solutions/articles/69000804571-how-do-i-know-if-i-am-in-the-waiting-room-), but not for viewing the event or entering a room (public or private). Although spatial view videoconferencing platforms make striking up a conversation easier, they make structured presentations and interchanges more difficult.

A. Methods for Creating Pre-Meeting Networking Sessions

Consider now FIG. 2C, which illustrates aspects of the present invention which facilitate pre- and post-meeting person-to-person networking for Zoom-like platforms.

FIG. 2C shows a virtual waiting room (231) and a virtual meeting room (205). In addition, this figure shows pre-meeting networking accessed from the waiting room (241) as well as the post-meeting networking (245) accessed after the meeting itself is concluded. Again, a timeline (215) shows the time periods before the meeting (221), during the meeting (223), and after the meeting (225). The meeting starts at time 204 and ends at time 210. The after-meeting networking ends at time 214.

In FIG. 2C, the host 201 has to open the waiting room, 231, as well as the meeting room 205. In a preferred embodiment, the host also starts the pre-meeting virtual networking features, 241, but after there are participants in the waiting room, 231. (In an alternative embodiment, these features are started automatically when the waiting room opens.) In the FIG. 2C scenario, everyone has to enter the waiting room, 231, before entering either the pre-meeting virtual networking space, 241, or the meeting itself, 205.

Once some people are in the waiting room, 231, (e.g., participants 203 and 204 join the waiting room), the host, 201, starts the pre-meeting virtual networking features, 241, but those in the waiting room are not forced to join the networking. Some might have joined the waiting room to make sure they would not miss the meeting—that is, they were online, with the videoconferencing software working, and successfully connected over the internet to the virtual meeting by the videoconferencing platform when the meeting was scheduled to start-but until the meeting actually starts, they are finishing other work. Consider that 243 shows some people joining (and transitioning) from the waiting room, 231, to the pre-meeting networking session, 241—but not all people who had been in the waiting room, 231.

In a preferred embodiment, when the host starts the pre-meeting virtual networking features, 241, those participants who have been cleared to enter the scheduled meeting are shown a software control or selection option on the videoconferencing interface which they can activate and which allows them to choose to enter the pre-meeting networking session. In an alternative embodiment, the control is always shown, but just can't be activated until the host starts the pre-meeting networking session and the participant is cleared. In another alternative embodiment, all participants are able to activate that control, whether or not cleared. (This latter embodiment is most likely to be used when most participants are personally known to the host, or are expected to be automatically cleared by the platform.)

In the discussion below, when a participant is said to have been "cleared" for admittance to a meeting or session (as in "cleared meeting participant"), it means that either the system or an administrator has determined that the participant has valid credentials to participate in the meeting or session and that the participant is permitted to participate in the meeting or session. A participant can be cleared via automatic or manual credentialing. In contrast, a participant who has not yet been cleared is referred to as "uncleared". An "uncleared meeting participant" is a potential meeting participant who is in the waiting room, or waiting buffer, waiting to be cleared. Notice that not all waiting room meeting participants are necessarily "cleared," including but not limited to perceived competitors, security risks or known bad actors.

Automatic credentialing or clearing occurs when a meeting participant enters valid pre-approved credentials into their participant computer as the participant is attempting to join the host-scheduled videoconferencing session, the credentials are recognized and accepted by the system or platform, and the system or platform (a) automatically places the meeting participant (via the participant's computer) in the waiting room, (b) allows for immediate interaction with other cleared meeting participants via their respective participant computers, and (c) allows for subsequent admission to the host-scheduled videoconferencing session or meeting.

When it is time (204) for the meeting (205) to start, all participants who have been cleared for admittance to the meeting are automatically transitioned (255) from the pre-meeting networking (241) to the meeting (205). These include those participants who were engaged in pre-meeting networking (253) as well as those (244) who had decided to remain in the waiting room (231) and not engage in networking.

Consider the transition (255) from the pre-meeting networking (253)—or the waiting room (244)—to the meeting itself (205). This entails which participant video feeds are sent to which other participants and how these video feeds are displayed.

First consider the waiting room. In the waiting room (231), participants do not see or hear (that is, are not sent or given access to) the video feeds of other participants.

Next consider the pre-meeting networking (241) in a Zoom-like platform. In a preferred embodiment of the pre-meeting networking, an algorithmic process matches small groups of participants with each other; then the videoconferencing platform sends video feeds of each member of each group to the other members of that group during a timed networking session; the videoconferencing platform displays these video feeds to each participant in the group, in a Zoom-like manner; and after the timed session is over, this is repeated so participants engage in multiple serial conversations during more than one networking session.

For a videoconferencing platform providing a pre-meeting networking with a spatial view instead of a Zoom-like view, it works a bit differently. In an alternative embodiment of the pre-meeting networking with a spatial view, an algorithmic process similarly matches small groups of participants, but the videoconferencing platform displays the video feeds of each group to the participants in that group using a spatial view-however, members of the group cannot see or find the video feeds of other non-group participants on their own. The effect is similar to having the algorithmically assisted platform assign participants to private rooms within the Flymachine platform, private floors within the Gatherly platform, or similarly configured locked areas or conversations within the Wonder platform. Consider that Flymachine currently allows participants to set up their own private rooms and invite their friends. Other participants who are not invited to the private room cannot find the room or gain access to it. In a preferred embodiment of the present invention, this process of setting up private rooms and inviting/assigning different participants to different private rooms is done automatically by the platform software. In an alternative embodiment these spatial view groupings are timed sessions; and at the end of the session, the algorithm specifies another grouping which the platform uses to assign participants to a different set of rooms.

In an alternate embodiment of a spatial view pre-meeting networking, the participants can choose to switch from one room to a different room. The effect is similar to assigning participants to Flymachine public rooms, Gatherly floors, or Wonder areas. In another alternative these switchable "public" rooms, floors or areas are named or labeled (including with a pop-up description that shows during a mouse-over event) to indicate the categories or topics which the algorithm is using to establish groups. This way, a participant who feels he or she has been placed in the wrong group for networking conversations can find a more appropriate group. Consider for example, a conference attendee who works in sales. An algorithm may place this attendee in a group of sales people. However, the attendee might be attending this particular conference because he or she wants to get viewpoints from those in other fields, such as marketing, development, or purchasing. In an alternative embodiment, the attendee is able to switch to a more appropriate networking group, the backend software remembers this user choice, and then adjusts the attendee profile for future algorithmic matching during the conference.

In an alternative embodiment of the pre-meeting networking, the videoconferencing platform shows the several video-chat networking sessions simultaneously, although only the audio streams from participants in one group are sent to (or enabled to be heard by) other members of that group.

In an alternate embodiment of the pre-meeting networking, the videoconferencing platform shows participants a spatial view of all participant video feeds, so that participants can seek out small group conversations themselves.

Now consider how the display of participant video feeds in the waiting room (231) and pre-meeting networking session (241) differs from the display of participant video feeds in the meeting room itself (205). In a preferred embodiment, the videoconferencing platform sends all participants the video feeds of all the other participants. Participants can view these video feeds in speaker or gallery view. In an alternative embodiment, the meeting is configured as a webinar—that is, the video feeds of just the presenters and panelists are sent to everyone, and not the video feeds of other participants. (Webinar style display of video feeds significantly reduces the internet bandwidth needed by the videoconferencing platform during the meeting. However, it does not reduce the usefulness of pre- and post-meeting networking sessions among other attendees.)

Participants can choose whether to join in pre-meeting networking (241), or just wait in the buffer (231) for the meeting (205) to begin. In a preferred embodiment, these mechanisms of the pre-meeting networking work in a similar manner to the workings of a feature Zoom includes in its meetings and breakout rooms. With Zoom, a host (having started a meeting) can start a set of breakout rooms which participants can choose to join—if they wish—but can also choose to remain in the original room. (Alternately, in Zoom the host can force all participants into breakout rooms.) However, these Zoom breakouts occur only after the host has had the opportunity to invoke the security of a waiting room to check out the participants, and either admit them or refuse them admittance. In contrast, the present invention allows limited participant interactions in a networking context, similar to such breakout rooms, while the host has the opportunity to perform security checks. Details of this process will be discussed in the context of FIG. 3.

Figure 3:
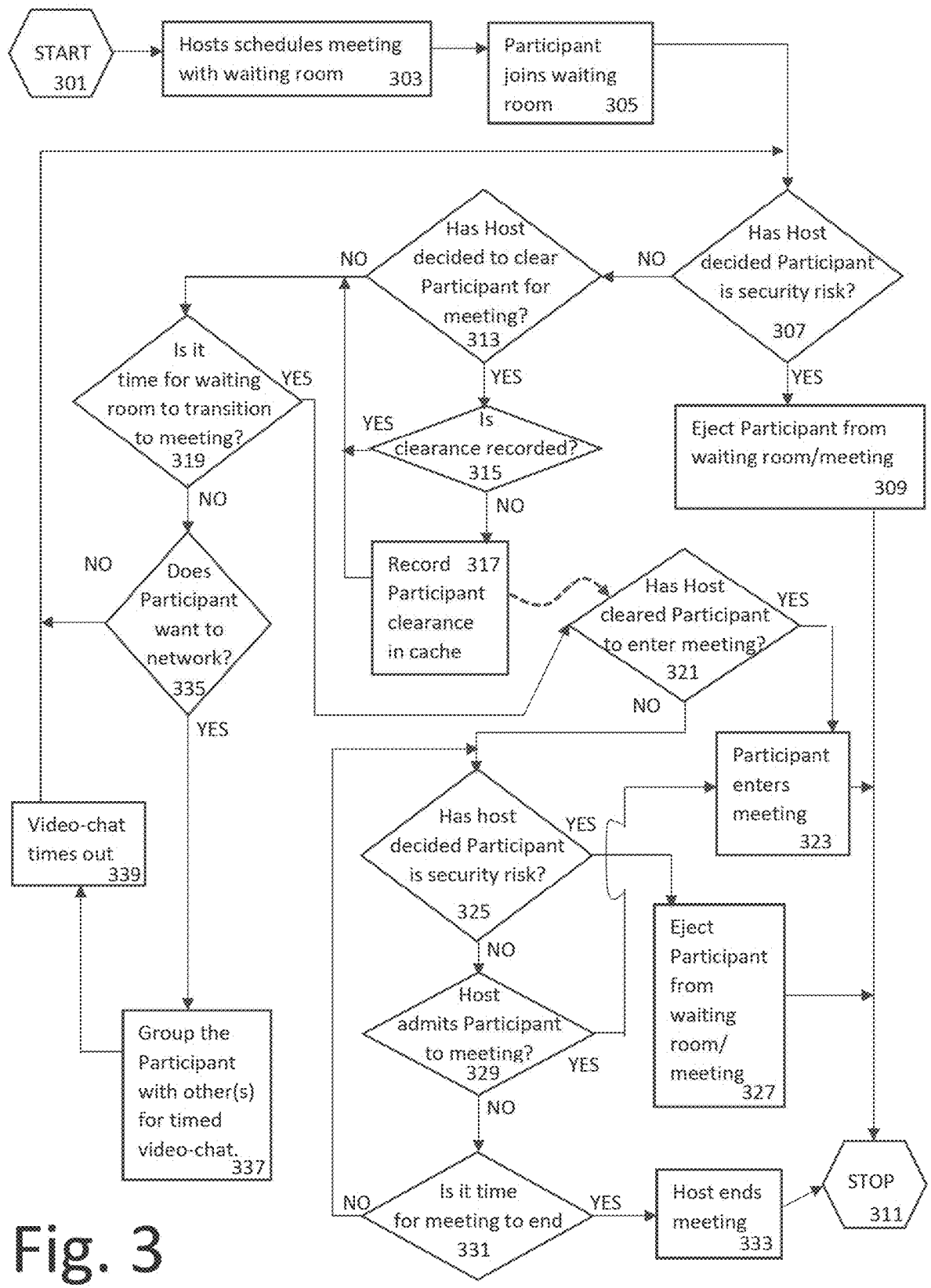
FIG. 3 is a flow chart with respect to a person's participation in an interpersonal pre-meeting networking session created in conjunction with a virtual waiting room that is associated with a meeting.

Consider now FIG. 3. The process starts (301) when the host schedules a meeting with a waiting room and pre-meeting networking features (303) and lets potential participants know about it. Then nothing happens (from the participant's point of view) until the participant joins the waiting room for the meeting at an appropriate time (305) before that meeting is scheduled to begin (before 204 in FIG. 2C). Continuing with FIG. 3, if the host is monitoring participants, and decides (307) that the participant is a security risk to the meeting, a troublemaker, or wasn't supposed to be there (i.e., not on the invitee list), then the host ejects (or removes) the participant from the waiting room/meeting session (309) and the process stops for that participant (311).

The application interface seen by the host includes controls by which the host ejects (removes) a participant. For example, Zoom has controls which allow a host to remove a participant from a waiting room (https://support.my.uq.edu.au/app/answers/detail/a_id/2922/~/how-do-i-manage-the-waiting-room-in-a-zoom-meeting) or a meeting (https://support.zoom.us/hc/en-us/articles/115005759423-Managing-participants-in-a-meeting or https://blog.zoom.us/keep-uninvited-guests-out-of-your-zoom-meeting/), or even move a participant out of the meeting and back into a waiting room (https://support.zoom.us/hc/en-us/articles/201362813).

The present invention adds the "clear" control (or command) to standard Zoom-like action choices of "admit" and "remove". The continuation of the flow chart in FIG. 3 details how in a preferred embodiment, when the host activates the "clear" control, the computer records that action in memory cache. See for example memory cache (527) in FIG. 5 of U.S. Pat. No. 11,107,490 (Slotznick). In an alternative embodiment, the memory cache (502 in FIG. 5 of U.S. Pat. No. 11,107,490) is located in the cloud (101 of FIG. 1) in a server computer working as part of the videoconferencing platform and participant video subsystem (105 and 109 of FIG. 1). Sec also server computers 403, 405, and 407 in FIG. 4 of U.S. Pat. No. 11,107,490 (Slotznick). Similarly, Zoom has controls which allow the host to admit a person to the meeting from the waiting room (step 437 in FIG. 4 discussed below) or to admit all people in the waiting room to the meeting simultaneously.

As is well known to those skilled in the art, the user interface shown to the host, co-host, or other administrator, differs somewhat from that shown to the ordinary participant, in part because of the addition of controls by which the host, co-host, other administrator is able to control, regulate, and manage the meeting. (The controls shown to those people undertaking different management roles also differ.)

Returning to FIG. 3. if, on the other hand, at decision point 307, the host has not yet decided that the participant is a security risk, then the process proceeds to decision point 313. At that point (313) if the host has not yet decided to clear the participant to enter the meeting when the meeting is scheduled to start (that is, enter at a later time 204 in FIG. 2C), the process continues at decision point 319. On the other hand, at decision point 313, if the host has decided to clear (or approve) the participant to later enter the meeting, the system checks to see if the host has recorded that clearance or approval (315) in memory cache. If so, the process continues at decision point 319. If clearance (approval) for the participant has not yet been recorded (answering "no" at decision point 315), the system records in a memory cache (317) that the participant has been cleared (or approved) to enter the meeting when the meeting starts (at time 204 in FIG. 2C). As mentioned above, the application interface for the host includes controls by which the host indicates that a participant is not considered a security risk (that is, "cleared" of major risk as well as "cleared" for entry), and is able to enter (transition) to the meeting when the meeting starts. These may be similar to Zoom's controls to admit a participant from a waiting room to a meeting, but are labeled differently to distinguish "admittance" from "clearance" for future admittance. After the computer records that the participant is cleared or approved in a memory cache (315), the process proceeds to decision point 319.

At decision point 319, if it is time for the meeting to start (time 204 in FIG. 2C)—that is, if it is the time at which the waiting room and pre-conferencing session transition to the meeting-then the process moves to decision point 321 in FIG. 3. If at decision point 321, it happens that the system had recorded that participant is cleared to enter the meeting (see 315 and 317 in FIG. 3), following a host's decision to clear the participant, then the participant enters the meeting (323) and the process stops (311). As discussed above, in a preferred embodiment, entering the meeting means that the videoconferencing platform sends all cleared participants the video feeds of all the other cleared participants. In the alternative embodiment where meetings are configured as webinars, entering the meeting means that the videoconferencing platform sends all cleared participants the video feeds of all panelists and presenters. Notice that while FIG. 3 focuses on a single participant, this particular action 319 (i.e., starting the meeting) applies to all participants, and all who have been cleared are transitioned to the meeting (see 421 in FIG. 4 discussed below) at approximately the same time.

For any participant who at step 321 had not been cleared to enter the meeting-perhaps because the host had not yet had time to evaluate that participant—that participant remains in the waiting room until the host either ejects the participant, admits the participant to the meeting, or the meeting ends. Per FIG. 3, if the participant had not been transitioned to the meeting at 323, has the host decided that the participant is a security risk (325)? If so, the participant is ejected from the waiting room/meeting (327) and the process ends (311). If not, the process asks whether the host is admitting the participant (329)? (Notice that this is different from clearing the participant for future admittance.) If so, the participant is admitted to the meeting (323) at this point in time and the process ends (311). If not, the participant remains in the waiting room and the process asks if it is time for the meeting to end (331). If so, the host ends the meeting (333) and the process ends (311). If at step 331 it is not time for the meeting to end, then the participant remains in the waiting room as the process continues to loop through 325, 329, and 319, until the participant is ejected (327), admitted to the meeting (323), or the meeting ends (333).

(Note, using methods known to those skilled in the art, in some embodiments the host or administrator manually and intentionally ends the meeting. In other embodiments the videoconferencing platform automatically ends the meeting at a pre-scheduled time.)

Returning to decision point 319, if it is not time for the meeting to start (and for the waiting room to transition to the meeting), then the process moves to decision point 335: does the participant want to network during the waiting period? If not, the participant remains in the waiting room and the process returns to 307, after which the process repeats through this loop (307, 313, 319, 335, 337, and 339), until the participant is ejected by the host (307 and 309) or the meeting starts and the networking session ends (319).

On the other hand, if at 335 the participant does want to network, the participant is grouped with some other participant(s) for a timed video-chat session (337). When the session times out (339), the process returns to 307. For a participant who is engaged in the networking features, this process repeats until participant is ejected by the host (307 and 309) or the meeting starts and the networking session ends (319).

Of course, a participant can change his or her mind about networking. That is, he or she can engage in a timed video-chat session, then decide to discontinue networking, but remain in the waiting room until the meeting starts. Alternatively, a participant can first decide to not network (for example, feeling a need to finish an email before the meeting), but then change his or her mind and join a subsequent timed networking session.

Because these networking video-chats consist of a series of timed meetings, a "late-coming" participant (one who joins the waiting room after it opens, but before the meeting) can still engage in pre-meeting networking. For someone who joins the waiting room (and opts-in to network) in the middle of a timed video-chat session, step 337 (in a preferred embodiment) displays a countdown until the participant grouping for the next video-chat networking session.

In addition, a participant can at any time decide to forgo the meeting and quit the waiting room or leave the networking session (not shown in either FIG. 2C or FIG. 3).

Notice that for the present invention, the combination of the waiting room and the pre-meeting networking session together allow the host sufficient time to decide whether to clear (allow) participants to attend the scheduled meeting or to keep them out (by ejecting them). In comparison to prior art, instead of the host just admitting participants directly from the waiting room to the meeting, the host identifies them as "to be admitted automatically" when the meeting starts.

In addition, during the networking, in a manner similar to that used by Zoom, via methods known to those skilled in the art, any participant can report another participant to the host for inappropriate behavior—and the host can take necessary or appropriate action, such as ejecting the offending participant.

Other aspects of the networking session reduce security risks during the course of the session itself, so that the host has time to check-out those who have joined the session. First, in a preferred embodiment, the pre-meeting video-chat sessions group only two or three participants together for each timed networking session. Consequently, fewer participants are exposed to a bad actor before he or she can be reported, or checked by the host. In an alternative embodiment, the pre-meeting video-chat sessions are somewhat larger groups, but still remain no more than five or six participants. This size group has been found to self-regulate a video-chat conversation without need for a moderator. In still another alternative embodiment, the size of the group in the video-chat networking session is larger than five or six.

In a preferred embodiment, the networking session does not allow screen sharing or file sharing among those in a video-chat session, further reducing the need for host involvement to ensure appropriate conduct. In an alternative embodiment, screen sharing and file sharing are allowed.

In a preferred embodiment, the video-chat networking sessions themselves are simultaneous breakout sessions such as those used in Zoom, Microsoft Teams, Google Meet, or Twine—but video-chat sessions which are scheduled iteratively (i.e., back-to-back) and automatically managed. Methods of and algorithms for creating, scheduling, managing, and populating such breakout sessions and discussion groups are well known to those skilled in the art. The host can designate how many people are in a session, how long a session lasts, and whether the participants are assigned randomly to a session, assigned to sessions based on predetermined characteristics (or categories), previously recorded in participant profiles, or allowed to choose among the simultaneous sessions.

In an alternative embodiment, the video-chat networking sessions themselves are simultaneous rooms in a spatial view platform (such as those used by Flymachine), floors (such as those used in Gatherly), or areas (such as those used in Wonder). In another alternate embodiment, the video-chat networking session show all participant video feeds in one spatial view.

FIG. 3 presented a flowchart of the meeting-based process through transition from the pre-meeting networking session (241) into the meeting, 205, primarily from the viewpoint of the host's interactions with and evaluations of a particular participant. That is, FIG. 3 is focused on steps in the host and system management of transitions of a particular participant into and out of the waiting room, pre-meeting networking, and meeting room. In contrast, FIG. 4 presents a flowchart of the same process primarily from the viewpoint of a host's need to manage such transitions with respect to all participants. FIG. 4 begins from when the meeting is scheduled (and before the meeting begins) through the end of the meeting. However, first, consider the rest of the flow of people in and out of the meeting itself as illustrated in FIG. 2C.

Returning to FIG. 2C for a moment. The meeting (205) starts at time 204, when those participants who had been cleared, while in the waiting room (231) or pre-meeting networking (241) are automatically admitted (255) to the meeting. If the waiting room remains open during the meeting (perhaps for security reasons, as with Zoom waiting rooms), non-host participants cannot join the meeting space at will, but must first join the waiting room. In any event, the waiting room (231) closes no later than time 210, when the meeting (205) closes.

During the course of the meeting, 223, others (207) may join the waiting room, 231. Furthermore, during the course of the meeting, 223, the host (201) may admit these others (237)—or anyone else in the waiting room—from the waiting room (231) to the meeting space (205). Also, some people (such as 209) may leave the meeting.

Again, the meeting, 205, ends at time, 210, when the host, 201, closes the meeting space and ushers people "out the door", or offers a transition (247) to post-meeting networking (245). At the close of the meeting, some people may elect to leave (246) to work on other projects or pursue other activities, while others stay for the networking, which is discussed in greater detail below.

Consider now FIG. 4 which presents a flow chart of the process by which the host manages the admission or ejection every and all participants into waiting room, pre-meeting networking, and meeting session—from the scheduling of a meeting through its conclusion, before post-meeting networking.

The process starts (401) when the host schedules a meeting with a waiting room and pre-meeting networking features (403) and lets potential participants know about it. Then nothing happens (from the host's point of view) until the host joins (or opens) the meeting (404) and its waiting room (405), together consisting of the videoconferencing session. The host joins the videoconferencing session (404) at an appropriate time before that meeting is scheduled to begin (before 204 in FIG. 2C). Continuing with FIG. 4, during the course of the waiting room before the meeting, the host is not actively monitoring discussions, but will consider each participant (406), to determine any security risk with respect to them.

In prior art, this security evaluation is not effectuated until right before the meeting, when the host admits participants from the waiting room into the meeting-often in a rush which delays the start of the meeting. In contrast, in the present invention, participants are incentivized to arrive a little earlier for networking-after all, that's a prime time for networking to take place. This allows the host to more efficiently make security evaluations of participants and clear participants for entry to the meeting before the meeting actually starts. Then, the videoconferencing system will automatically bring all of the cleared participants into the meeting when it starts.

If the host decides (407) that a participant is a security risk to the meeting, a troublemaker, or wasn't supposed to be there (i.e., not on the invitee list), then the host ejects (removes) the participant from the waiting room/meeting session (409). Notice that although the process stops for that participant (see 311 in FIG. 3), the process continues for the host—as the host monitors and evaluates any participants who may from time to time enter the waiting room—to decision point 413. The application's interface for the host includes controls by which the host admits a participant, ejects (removes) a participant or designates a participant as "to be admitted automatically" at a later time (when the meeting starts and the waiting room/networking session transitions to the meeting).

If, on the other hand, at decision point 407, the host has not yet decided that the participant is a security risk, then the process proceeds to decision point 413. At that point (413) if the host has not yet decided to clear the participant to enter the meeting when the meeting is scheduled to start (that is, enter at a later time 204 in FIG. 2C), the process continues at decision point 417. If instead, at decision point 413, the host has decided to clear (or approve) the participant to enter the meeting when it starts, the system checks to see if the host has recorded that clearance or approval (414). If so, the process continues at decision point 417. If clearance (approval) for the participant has not yet been recorded (i.e., answering "no" at decision point 414), the system records the clearance (approval) in a memory cache (415). In a preferred embodiment, the memory cache is in the host's computer or computing device. (In an alternative embodiment, the memory cache is in a server computer in the cloud, which is part of the videoconferencing platform.) This way, the system knows that the participant has been cleared (or approved) to enter the meeting when the meeting starts (at time 204 in FIG. 2C). As previously noted, the application's interface for the host includes controls by which the host indicates that a participant is not considered a security risk, and is able to enter (transition) to the meeting when the meeting starts. After the computer records that the participant is cleared or approved in a memory cache (415), the process proceeds to decision point 417.

Decision point 417 asks if it is time for the meeting to start—and for the waiting room and pre-meeting networking session to transition to the meeting. If it is not yet time 204 in FIG. 2C, the host continues to monitor the waiting room/networking session (418). If there are no participants in the waiting room/networking session (420) the process continues to loop through 417, 418, and 420, until either a participant enters the room, or its time 204 for the meeting to start.

If instead there are participants in the waiting room/networking session (420) the host continues to evaluate them, one by one, via process loop 406, 407, 413, 417, 418, and 420 until the meeting starts (417). At this point (421) participants who have been cleared (see step 415) are automatically admitted to the meeting.

As shown in FIG. 2C, even though the pre-meeting networking session (241) is now closed, the waiting room (231) remains open for security reasons. That is, people joining the meeting (205) while it is in session, must still pass through the waiting room so that the host can check to see if they were invited. (See previous discussion of FIG. 2C.) Consequently, per FIG. 4, the host must continue to monitor the meeting waiting rooms (422) until it is time for the meeting to end (423) when the host ends the meeting (425) and this process stops (427). (The transition to the post-meeting networking session will be discussed below, and need not require monitoring by the host.)

The host continues to monitor the waiting room for the meeting, 422 (in similar fashion to the way the host monitored the waiting room and pre-networking session discussed above), whether or not there are any participants in the waiting room (429). If (during the meeting itself) there are any participants in the waiting room (429), the host considers each participant (431), one at a time, and evaluates if that participant is a security risk, trouble maker, or non-invitee (433). If so, the participant is ejected (435). If not, the host admits the participant to the meeting (437). Also (not shown), the host cannot make a decision about the participant and continue to consider the participant until it is time for the meeting to end 423. This loop (422, 423, 429, 431, 433, 435, and 437) continues until it is time for the meeting to end (423, 425, and 427).

In an alternative embodiment, the participant enters the meeting directly once the meeting starts—that is, once the meeting starts, there is no longer a virtual waiting room.

In a preferred embodiment of the invention, after the meeting ends, the videoconferencing session transitions into a post-meeting networking session. In an alternate embodiment, the session only incorporates pre-meeting networking as described above.

The discussion above has focused on the flow of people in and out of the various virtual spaces associated with a videoconferencing gathering-during the pre-meeting time window, up to the start of a meeting (FIG. 2A, FIG. 2B, and FIG. 2C). That discussion also considered the flow of actions taken by the host and participants in that time frame (FIG. 3 and FIG. 4). Consider now the interfaces seen by the host and participants as they take these actions (FIG. 8A, FIG. 8B, FIG. 8C, FIG. 9A, FIG. 9B, FIG. 10A, FIG. 10B, and FIG. 10C).

Figure 8A:
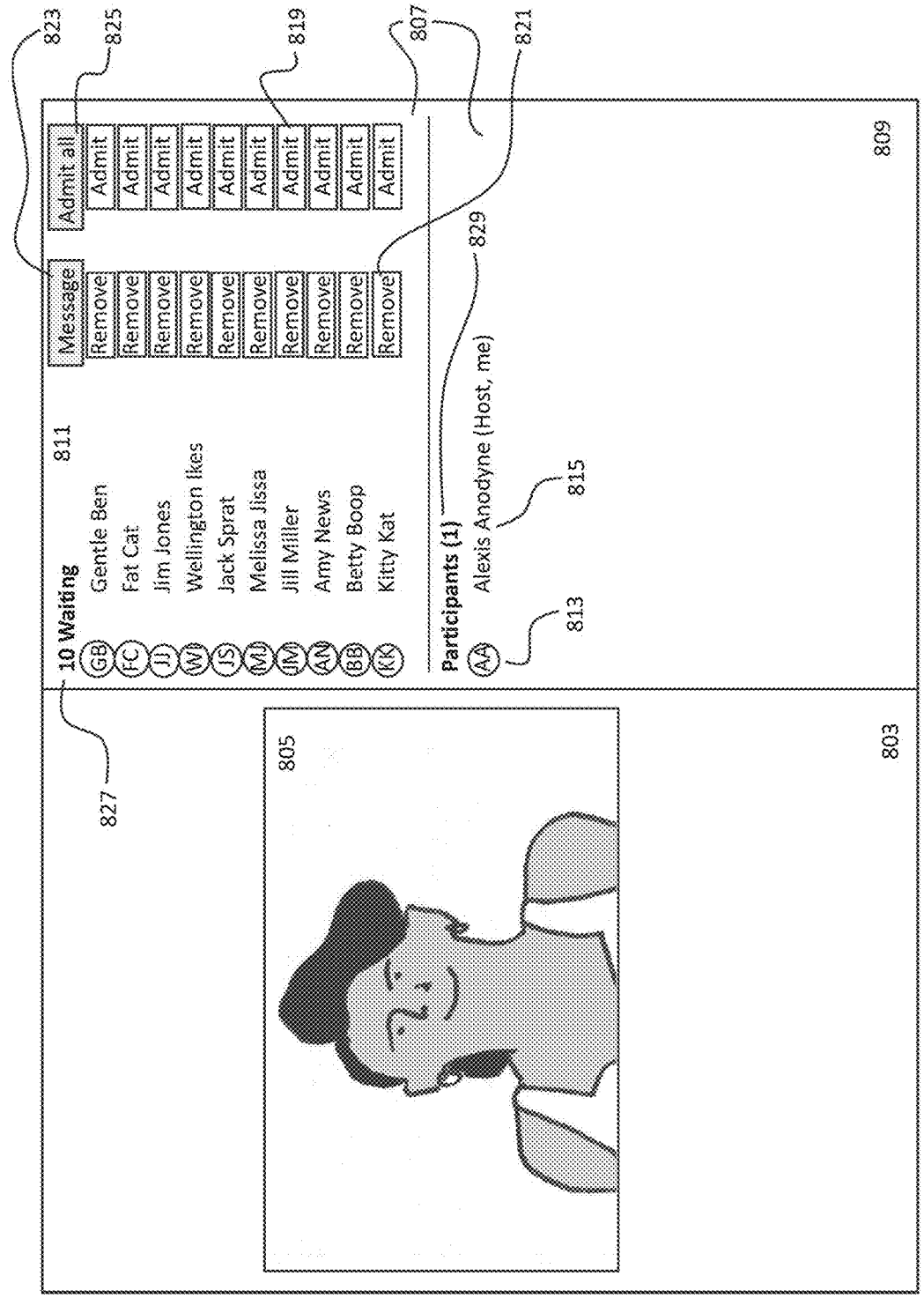
FIG. 8A is a generalized picture of an interface for prior art showing the host's computer screen for the videoconferencing interface, after the waiting room is open, but prior to the start of the meeting itself. The picture shows both a video chat window and a participant window.

Consider FIG. 8A, which is what the host currently sees in videoconferencing platforms like Zoom (that is, prior art) on his or her computer when opening a videoconferencing gathering. This is what the host sees after the waiting room is open and the host has "started" the meeting by logging in-a point in time when some potential participants have joined the waiting room, but before any participants (other than the host) have been admitted to the virtual meeting space, that is, time period 221 in FIG. 2B or FIG. 2C.

An interface shown in FIG. 8A for the videoconferencing platform appears in a window, 801, on the host's computer. This interface includes a window, 803, for video feeds, 805. At this point in the meeting, only the host has joined and been admitted, so the video feed, 805, is that of the host.

The host's interface also includes a window, 807, listing participants and potential participants in the meeting. Part of this participant window shows participants who have been admitted to the meeting, 809. Another part of the participant window shows participants who have joined the waiting room, 811, which will be referred to as potential participants. At this point in the meeting, only the host has joined and been admitted, so 809 includes only the host's name (Alexis Anodyne), 815, and the host's avatar, icon, or thumbnail picture, 813. In many cases, the videoconferencing platform creates (as shown in the figure) an icon for the participant using the participant's initials. The interface may contain other control interfaces for the host (or participants) which are not relevant to this discussion, so are not shown in this figure. This portion of the window, 809, includes the label "Participants (1)" which indicates it is a list of participants and includes an enumeration of the number of participants who have been admitted, 829.

The other potential participants have joined the waiting room and are listed in that portion, 811, of the interface. In this illustrative example, there are ten of them. This portion of the interface, 811, includes a label "10 Waiting", 827, to indicate that the names listed in this portion of the interface are potential participants in the waiting room, along with an enumeration of the number of these participants. Each name on the list (shown, but not numbered) has both the potential participant's name as well as the potential participant's avatar, icon, or thumbnail picture.

Alongside each name in list, 811, of potential participants in the waiting room, are two controls or virtual buttons. One reads "Admit", 819. The other reads "Remove", 821. Other platforms may label these buttons with different but equivalent words, such as "eject" instead of "remove". When the host presses the Admit control, 819, that participant is admitted to the meeting virtual space. The participant's name and icon, avatar, or thumbnail is added to that portion of the interface, 809, which lists participants. The enumeration of participants, 829, is incremented by one. At the same time the participant's name and icon, avatar, or thumbnail is removed from the waiting room list 811, and the waiting room label, 827, is reduced by one. When everyone previously in the waiting room, 811, has been either admitted to the meeting 809, or removed, the waiting room listing, 811 disappears from the host's interface.

If during the meeting itself (time period 223 in FIG. 2B), other people attempt to join the meeting after it has started, many current videoconferencing platforms place those potential participants in a waiting room (participants 207 joining waiting room 231 of FIG. 2B), so that the host can decide whether they should be admitted to the meeting (205 in FIG. 2B) or not. In that case the waiting room area, 811 in FIG. 8A, reappears with the names of potential participants along with their avatars, icons, or thumbnails, plus controls to admit or remove them.

Also, when the participant is admitted to the meeting, the participant's video feed (not shown) may be added to the video window, 803, depending on platform settings. The video will be added for a Zoom-style meeting which includes the possibility of a gallery view of all participants. However, for a webinar style meeting, the interface might not show all participant video fees, but rather only participants who are panelists or presenters. This not only conserve's bandwidth, but for a large webinar (say 100 participants in the audience) it makes the interface more comprehensible for and useable by the host. This discussion is focused on what the host sees (and needs to see) in the interface when admitting people to the meeting, so does not discuss ways to enable other participants' video feeds to be shown to others during the course of the meeting or webinar.

What does the meeting participant see when admitted to the meeting? What the meeting participant sees, when the host activates a control, 819, admitting that person to the meeting depends on a variety of platform options. (For that reason, the meeting participant's view the interface during the meeting itself is not shown as a separately numbered figure.) However, the participant does see a video feed window such as 803, that shows the host, 805, and other panelists or participants, depending upon whether the gathering is a meeting style or webinar style. In many cases, the participant also sees a list of participants admitted to the meeting, 809. However, an ordinary participant does not see a list of those still in the waiting room, 811.

Returning now to the host view shown in FIG. 8A. The host admits participants to the meeting one-by-one, using Admit controls such as 819, and as discussed above. Alternatively, the host admits everyone then in the waiting room, by activating an "Admit all" control, such as shown in 825. (See 235 in FIG. 2B.)

The host may decide not to admit a potential participant. Perhaps the person is a "bad actor"-someone who is known to be abusive, shout obscenities, or display pornography (known as "Zoom bombing"). Alternatively, the person, might just be someone who is disruptive of meetings. Alternatively, the person might be a nice polite guy, but work for a competitor. Alternatively, the meeting might be a confidential one, intended to promote or fire a person-so that person would not be admitted to the meeting. The point is that there are many reasons why some people are not admitted by the host to a meeting—and the waiting room feature is designed to allow a host to filter those people out. The host can do this by just not admitting them. Alternatively, the host removes that person from the waiting room, by activating a "Remove" control, such as 821. This is the same as ejecting that person from the gathering.

If the host does not recognize the name of a person in the waiting room, the host can send that person a text message, by activating control 823, and thereby query that person to obtain more information before deciding whether to admit or remove him or her. When queried with a pop-up text message (not shown), using methods known to those skilled in the art, the pop-up window includes means for the person to send a text reply (not shown). The host may also message everyone in the waiting room, using control 823. For example, the host uses this feature to tell people in the waiting room that the meeting will start a few minutes late.

Figure 9A:
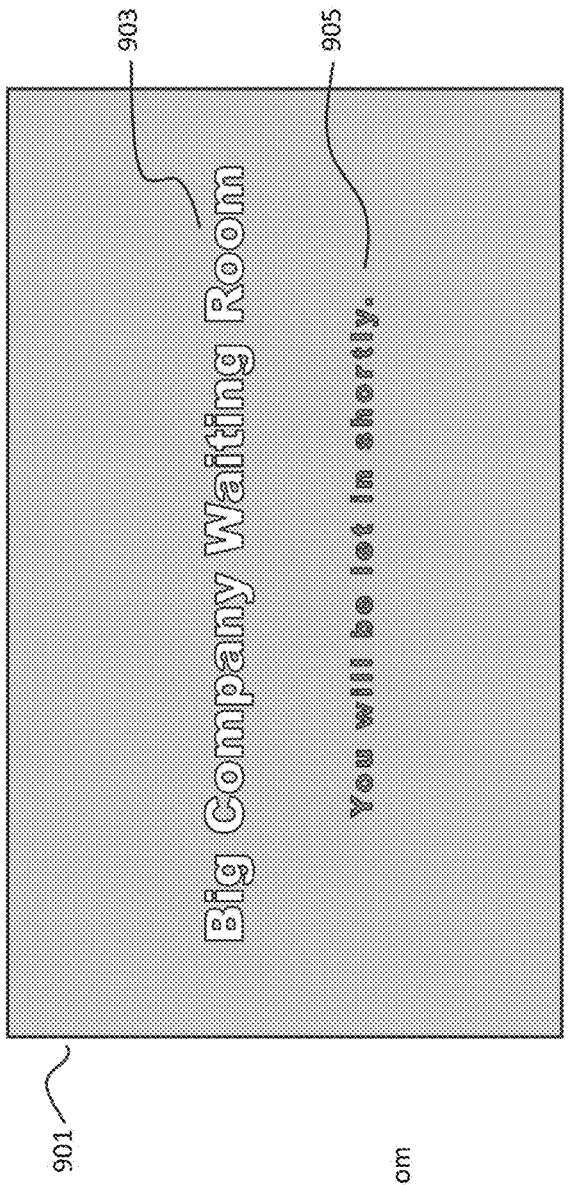
FIG. 9A is a generalized picture of an interface for prior art, showing the screen a potential participant when he or she enters the waiting room.

Consider now FIG. 9A which shows what a potential participant currently sees (in prior art) after entering the waiting room. A window, 901, appears on the potential participant's computer screen. The window includes text to tell the potential participant that he or she is in a waiting room, 903, and that the meeting will begin shortly, 905. Many platforms allow the host to customize this screen with a company logo, or label (903), company colors, a promotional video, and a customized greeting (905). The potential participant may also see some controls by which he or she can check the settings of his or her audio and video systems. But note, at this point in time (221 in FIG. 2B), the potential participant does not see the host or any other participant.

Consider now the host interface for the present invention; the interface corresponding to FIG. 8A. As in FIG. 8A, there is still a video feed window, but it is not shown in FIG. 8B, because this discussion focuses on the listing of participants and potential participants, shown as 807 in FIG. 8A (for prior art) and 831 in FIG. 8B (for the present invention). In FIG. 8B, there is still a listing of participants admitted to the meeting, 809, which at this moment is only the host (Alexis Anodyne), 815. Also included for each admitted participant is the participant's avatar, icon, or thumbnail picture, 813. The list of participants is still labeled and enumerated, 829.

FIG. 8B, still includes a listing, 811, of participants in the waiting room, along with their avatars, icons, or thumbnails. The list of those waiting is still labeled and enumerated, 827.

Note, a new feature of this window is an area, 833, labeled "Cleared (0)", 835. This label indicates that no potential participant has yet been cleared to participant in a pre-meeting networking session, or the meeting itself.

Instead of the "Admit" controls (819 and 825) shown in FIG. 8A, FIG. 8B presents "Clear" controls which allow the host to clear people to the pre-meeting networking sessions (which also clears them for the subsequent meeting itself). The host clears people in the waiting room one-by-one, by activating the "Clear" control, 839, shown in line with the person's name (this decision to clear or admit is made at steps 313 and 327 in FIG. 3 and step 413 in FIG. 4). The host can instead clear all people at once, by activating the "Clear all" control, 837. As previously, the host can decide not to clear a person, or can actively remove that person from the waiting room by activating the "Remove" control, 821 (see step 309 and 327 of FIG. 3, using the word "eject" instead of "remove", and step 409 of FIG. 4). As previously, the host can use the message control, 823, to query individual potential participants in the waiting room, to verify bona fides, or to broadcast a message to everyone in the waiting room.

Consider FIG. 8C which shows the host's participant window, 831, after the host has started clearing people, but before the meeting itself has begun. When the host clears a person in the waiting room, that person's name and avatar, icon, or thumbnail is removed from the list of those waiting, 811, and added to the list of those cleared, 833. See for example, the three people, 841, listed in cleared section 833. The label for the cleared list, 843, is incremented accordingly, and the label for the waiting area, 845, is reduced in number accordingly. This way, the host can keep track of who has been cleared, and who still needs to be cleared.

When everyone previously in the waiting room, 811, has been either cleared for the meeting, 833, or removed, the waiting room listing, 811, disappears from the host's interface.

If during the pre-meeting time window, other people attempt to join the meeting they are placed in a waiting room, and shown an interface such as FIG. 9A, so that the host can decide whether they should be admitted or not. In that case the waiting room area, 811, of FIG. 8C reappears with the names of potential participants along with their avatars, icons, or thumbnails, and controls to clear or remove them.

After the meeting starts, if other people attempt to join the meeting (people 207 of FIG. 2C attempting to join meeting 205), they are placed in a waiting room (231 of FIG. 2C), and shown an interface such as FIG. 9A, so that the host can decide whether they should be admitted to the meeting or not (see step 435 and 437 of FIG. 4). In that case, a waiting room area, 811, of the participant list portion of the host interface appears, with the names of potential participants along with their avatars, icons, or thumbnails. However, this interface looks like FIG. 8A to show "Admit" controls, rather than "Clear" controls, because such potential participants are admitted directly to the meeting rather than cleared for admission to a pre-meeting networking session (or the meeting scheduled to start in the near future).

The list of participants admitted to the meeting, 809 in FIG. 8C as in 809 of FIG. 8B, remains the same. In alternative embodiments, the host can admit co-hosts or panelists directly to the meeting, rather than clear them for pre-meeting networking sessions, or admit them to a "green room" feature for panelists to prepare for the meeting that is about to start.

Consider now what a potential participant sees prior to the start of the meeting-when using the present invention. The potential participant first sees an interface such as window 901 in FIG. 9A, when he or she enters the waiting room. As discussed above, this includes some labeling to make clear that this is a waiting room, 903, plus a welcome message that the meeting will begin shortly, 905.

Figure 9B:
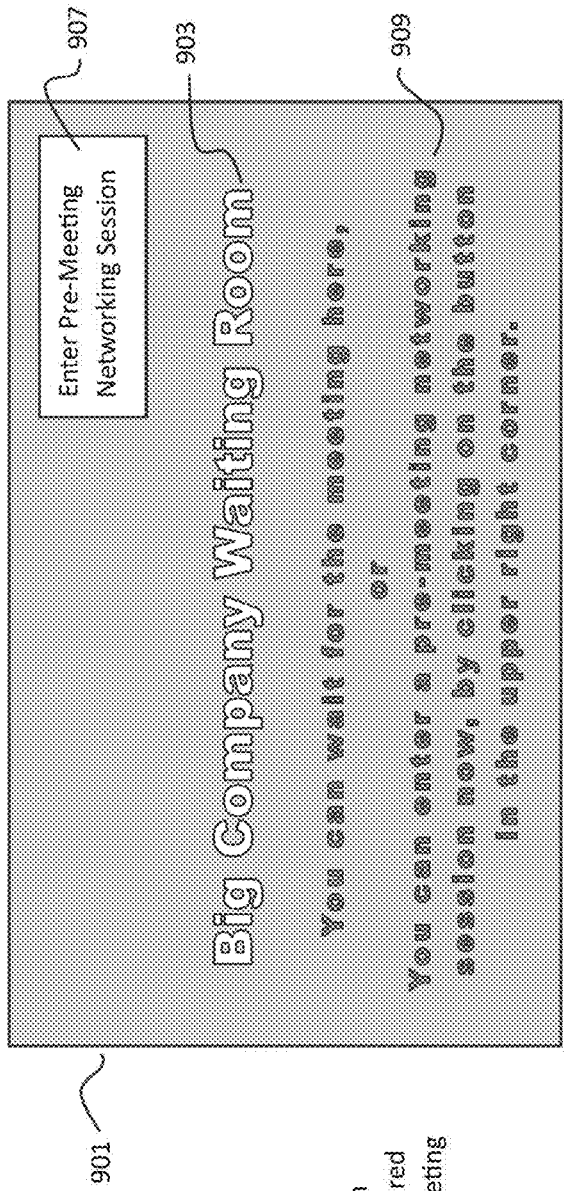
FIG. 9B is a generalized picture showing the screen of a participant using the present invention who has just been cleared to enter the meeting or engage in pre-meeting networking.

When a person is cleared by the host, the interface changes to FIG. 9B. The interface window, 901, still has a waiting room label, 903, but the message changes to explain how the participant enters a pre-meeting networking session, 909, via a control, 907 (a selection option on the videoconferencing interface), that the participant activates to enter the pre-meeting session. Note though, that the participant is not required to activate this selection option, and can remain in the waiting room until the meeting itself begins at the scheduled time.

The discussion above has noted that a pre-meeting networking session may have a Zoom-like gallery view for interactions, or present various other views including, but not limited to a spatial view, or a restricted spatial view such as (but not limited to) a table view. Consider now some of the potential interfaces that a participant sees when that participant wishes to engage in a pre-meeting networking session, 241 in FIG. 2C (step 335 of FIG. 3) and activates the selection option control, 907.

In a preferred embodiment, a participant is matched with a pre-specified number of other participants for a video networking session by an algorithmic or random process. In that case the participants who are matched see an interface such as FIG. 10A, with a window, 1001, showing video feeds (e.g., 1003) of their networking group. In certain matching program paradigms such as versions of Chatroulette or Twine, this is all that the participants see. After a pre-set time to network, participants are matched with others for another networking session. This continues for a number of pre-set time periods until the schedule time for the meeting, as disclosed above, when all cleared participants are admitted to the meeting itself.

FIG. 10B shows the interface for an alternative embodiment, which utilizes a spatial view. The interface window, 1001, includes a spatial view window, 1009, with icons, avatars, or thumbnails of all cleared participants in the pre-meeting networking session-a combination in this example of the ten individuals in both 1013 and 1011. (In FIG. 10B participants are shown as thumbnails within hexagons, but other implementations use circles.). Participants can move their icons, avatars or thumbnails freely about the space. When a set of the icons, avatars, or thumbnails get close to each other, such as 1013, they form a conversation circle (or group).

FIG. 10B shows the interface as seen by members of the conversation circle 1013. Members of a conversation group can hear each other talk, and can see each other's video feeds, 1005. In the illustrated implementation, they also see a listing of the names of the people in their conversation circle in a modified participant listing window, 1007. Using methods known to those skilled in the art, the maximum number of people in a conversation circle can be specified in the platform settings.

The spatial view, 1009, shows the other cleared participants, 1011, so that participants can plan to meet others for additional networking during the pre-meeting time window. In some embodiments, after a pre-set time, an announcement urges participants to find another group. Alternatively, after a pre-set time, the platform forces all conversation circles apart, allowing participants to find new conversation and networking partners on their own.

FIG. 10C shows the interface for an alternative embodiment, which utilizes a restricted spatial view. This restricted spatial view shows an overhead schematic of tables with four chairs at each table, sometimes called a table view. The platform settings permit the host to configure how many chairs are at each table. The view is restricted because each participant can only place his or her icon, avatar, or thumbnail in an empty chair—and cannot move freely about the space. A participant joins a table, by clicking on an empty chair, or on the table at which there is an empty chair.

The interface window, 1001, includes a spatial view window, 1017, with icons, avatars, or thumbnails of all cleared participants in the pre-meeting networking, along with the schematic view of tables and chairs.

FIG. 10C shows the interface as seen by the four participants who placed their icons at one table, 1019. They hear each other, and see each other's video feeds, 1005. They see a listing of all cleared participants, along with their icons, who have joined the networking session, in a modified version of a participant view, 1007. They also see an indication of which participants (by name and icon) are seated at their table, 1015. They also see the icons of participants at other tables, 1021 and 1023, to help plan additional networking conversation during the pre-meeting time window.

B. Methods for Creating Post-Meeting Networking Sessions.

Returning again to FIG. 2C, this figure describes the flow of people into and out of the post-meeting networking session. When the meeting, 205, ends at time 210, the host, 201, closes the meeting space or offers a transition (247) to post-meeting networking (245). In an alternate embodiment, the videoconferencing platform transitions to the post-meeting networking session automatically, without host intervention.

Consider how the display of participant video feeds in the meeting room (205) differs from the display of participant video feeds in the post-meeting networking session (245), and the transition between those methods of display. As discussed above, in the meeting room of a preferred embodiment, the videoconferencing platform sends all participants the video feeds of all the other participants—or in an alternative embodiment where the meeting is configured as a webinar, the video feeds of just the presenters and panelists are sent to everyone, and not the video feeds of other participants.

Next consider the post-meeting networking (245) in a Zoom-like presentation. In a preferred embodiment of the post-meeting networking, an algorithmic process matches small groups (or pairings) of participants with each other; then the videoconferencing platform sends video feeds of each member of each group (or pairing) to the other members of that group during a timed networking session; the videoconferencing platform displays these video feeds to each participant in the group, in a Zoom-like manner. In an alternative embodiment, this algorithmic process is repeated so participants engage in multiple serial conversations during more than one networking session.

For a videoconferencing platform providing a post-meeting networking with a spatial view instead of a Zoom-like view, it works a bit differently. In an alternative embodiment of post-meeting networking with respect to use of a spatial view, an algorithmic process similarly matches small groups of participants, but the videoconferencing platform displays the video feeds of each group to the participants in that group using a spatial view-however, members of the group cannot see or find the video feeds of other non-group participants on their own. The effect is similar to having the algorithmically assisted platform assign participants to private rooms within the Flymachine platform, private floors within the Gatherly platform, or similarly configured (e.g., locked) areas within the Wonder platform. Consider that Flymachine currently allows participants to set up their own private rooms and invite their friends. Other participants who are not invited to the private room cannot find the room or gain access to it. In a preferred embodiment of the present invention, this process of setting up private rooms and inviting/assigning different participants to different private rooms is done automatically by the present invention's platform software. In an alternative embodiment these spatial view groupings are timed sessions; and at the end of the session, the algorithm specifies another grouping which the platform uses to assign participants to a different set of rooms.

In an alternate embodiment of a spatial view post-meeting networking session, the participants can choose to switch from one room to a different room. The effect is similar to assigning participants to Flymachine public rooms, Gatherly floors, or Wonder areas. In another alternative these switchable "public" rooms, floors or areas are named or labeled (including with a pop-up description that shows during a mouse-over event) to indicate the categories or topics which the algorithm is using to establish groups. This way, a participant who feels he or she has been placed in the wrong group for networking conversations can find a more appropriate group. Consider for example, a conference attendee who works in sales. An algorithm may place this attendee in a group of sales people. However, the attendee might be attending this particular conference event because he or she wants to get viewpoints from those in other fields, such as marketing, development, or purchasing. This implementation would allow the attendee to switch to a more appropriate networking group. Indeed, the backend software could use this switch to adjust the attendee profile for future networking matchmaking during the conference.

In an alternative embodiment of the post-meeting networking, the videoconferencing platform shows to each participant the several video-chat networking sessions simultaneously, although only the audio streams from participants in one group are sent to (or enabled to be heard by) other members of that group.

In an alternate embodiment of the post-meeting networking, the videoconferencing platform shows participants a spatial view of all participant video feeds, so that participants can seek out small group conversations themselves.

Returning now to FIG. 2C. At the close of the meeting, some people (including the host) may elect to leave (246) to pursue other activities, while others stay for (and transition to, 247) the post-meeting networking (245).

In a preferred embodiment, the host has scheduled the post-networking session for a specific amount of time-so that the session automatically ends at 214. Participants may leave the session earlier, 248. If all participants leave before 214, the session ends earlier than scheduled (as discussed in FIG. 5). The host (201) may leave to pursue other activities (e.g., 246) or may stay for the networking. In an alternative embodiment, the host (201) not only stays for the networking, but intentionally closes the networking session at time 214.

(As noted above, waiting to video-chat with a presenter or host is a transaction-based queue, rather than a meeting-based queue-even though it occurs at the end of a meeting.)

The post-meeting networking session, 245, ends at time 214. Those participants who had been networking (249) are now free to engage in other activities.

Consider now FIG. 5, which presents a flowchart of the process for the post-meeting networking session (that is, the networking session after meeting 205 ends), primarily from system interactions with the participant.

In a preferred embodiment, the meeting (205) also serves as a "green room" style gateway for the post-meeting session. (See reference to Zoom "green room" feature above: https://support.zoom.us/hc/en-us/articles/360051861511-Green-Room-Process.) At the end of the meeting a link to the post-meeting networking session (another videoconferencing session) is automatically displayed to each meeting participant, in the form of a pop-up window. Clicking on the link will automatically take the clicking participant to the new videoconferencing session (without a waiting room) when the current meeting closes. Alternatively, instead displaying a clickable link, the link is embedded in a button or control that a participant can activate. (The button reads "Join post-meeting networking session" or similarly appropriate text.) In an alternative embodiment the link is automatically sent to all participants via the meetings text-chat window, just a few moments before the meeting closes.

In an alternative embodiment, participants must opt-out of the networking session, rather than opt-in, so that they are automatically sent, forwarded, or transitioned to the post-meeting networking session unless they click on a button, such as the "Leave meeting" button.

In a preferred embodiment, the post-meeting networking consists of timed video-chat sessions among small groups, such as enabled by Twine. A flowchart detailing aspects of these sessions is found in FIG. 5. In an alternative embodiment, the post-meeting networking consists of a spatial proximity video-conferencing session such as one would find on Flymachine, Wonder, or Gatherly. These are less structured sessions that more resemble cocktail parties than speed dating. Some of these platforms (such as Flymachine) are intended to include background music (or entertainment) similar to the musicians at a networking cocktail party.

In a preferred embodiment, the post-meeting networking session is a videoconferencing session with the same kind of interface as the meeting. In other words, if the meeting utilizes speaker view and gallery view (similar to Zoom), the post-meeting session also uses speaker view and gallery view. However, if the meeting utilizes a spatial proximity view (such as Wonder or Gatherly), then the post-meeting session also uses a spatial proximity view. In an alternative embodiment, the post-meeting networking session uses a different interface than the meeting. For example, the meeting may utilize speaker view and gallery view (similar to Zoom), while the post-meeting session uses a spatial proximity view (such as Wonder or Flymachine). The choice depends upon how formal and structured, or casual and unstructured, the meeting and networking sessions are intended to be.

The same considerations apply to consistency versus contrast of user interfaces and platform display when comparing pre-meeting networking sessions and the meeting itself.

The process illustrated in FIG. 5 starts (501) when a meeting that was scheduled to include post-meeting networking ends (503) and transitions to the networking session. Some participants (such as 246 in FIG. 2C) will choose not to stay around. Others will (such as those indicated by 247 in FIG. 2C). Consider one of those participants who remains after the meeting to join the networking session (step 505 in FIG. 5).

If it is time for this networking session to end (507), the session closes (509) and the process stops (511). In a preferred embodiment, the session closes automatically when it times out. In an alternative embodiment, a person serves as host for this session and manually closes it.

On the other hand, if it is not time for the session to end (507), are there any other participants still in the networking session (513)? If not, the networking session automatically ends (509) and the process stops (511).

Otherwise, the process reaches decision point 515. If the participant does not want to continue networking for the moment, he or she will not be placed in a video-chat session, but the screen will show the countdown until the end of this networking session (517), that is, time 214 in FIG. 2C. (In an alternative embodiment, the screen will also show a countdown to the next timed video-chat session.) A participant might want to sit out one video-chat session and join in the next. In this case, at decision point 519, the participant indicates that he or she does not want to leave the networking session. In a preferred embodiment, this is accomplished via affirmative opt-in (clicking on a "remain" or "rejoin" button). In an alternative embodiment, this is accomplished via opt-out (choosing not to click on a "leave" button). In any event, if the participant stays for another session the process returns to 507. However, if the person wants to leave the networking session (519), he or she can do so via a "leave" or "exit" button, at which point the process ends (511) for this participant.

Consider again decision point 515. If the participant still wants to network, the application groups the participant with others for a timed video-chat (537). When the video-chat times out (539), the process returns to 507 (Is it time for the networking session to end?). Thus, although a participant can leave the networking session, or sit out one or more timed video-chats, as long as the participant remains in the networking session and wishes to network, the application will match the participant up with others for casual video-chat.

In a preferred embodiment, the timed series of post-meeting networking video-chats is accomplished in the same manner as discussed for pre-meeting networking video-chats. This uses methods such as those adopted by Zoom or Twine for breakout rooms and networking session, and as known by those skilled in the art.

In an alternative embodiment, the post-meeting networking session is based on a spatial proximity videoconferencing platform. In that case, (1) steps 537 and 539 are combined to become step 538, which reads: Group participants in a room, floor, or conversation circle in a spatial videoconferencing program, and (2) step 517 is deleted.

The transition (of method) of participant video feed display from one type of session to another is discussed above.

The discussion above has referenced videoconferencing platforms based on a spatial view or restricted spatial view (such as a seating view, including, but not limited to, a table view or row view), videoconferencing platforms based on a Zoom-like or gallery view, and videoconferencing platforms that employ a hybrid approach of spatial and gallery views. The discussion has disclosed how to implement networking sessions during the waiting buffer before or after a host-scheduled videoconferencing session. To be clear, the presentation and video display for a waiting room, a pre-meeting networking session, a post-meeting network session, and the scheduled meeting which they bracket do not have to employ the same layout or display of participant videos and avatars. Rather, each virtual session (waiting, pre-, post-, or scheduled) may independently embody a gallery view, a spatial view, or a combination view.

In an alternative embodiment, instead of the event using one videoconferencing platform, employing different views for the different sessions (waiting, pre-, post-, and scheduled), the event uses a different videoconferencing platform for at least two of these possible sessions, each platform employing a different view, and the two platforms being linked via transitions described as above.

So far, the disclosure has focused on meetings or transactions where the number of people in the pre-meeting queue is similar to the number of people who can be serviced in the unit of time in a single production cycle. For example, all the people waiting for a meeting are able to attend that meeting once the meeting begins. The waiting area may remain open to admit late-comers in an appropriate and secure manner, but still the waiting buffer for that specific meeting is expected to close or disappear when the transaction consisting of the meeting is complete. In contrast, the line to purchase a movie ticket has more people in it than the ticketing person can service at once—and the line will persist longer than any single transaction. As mentioned above, such physical and virtual transactions are now using software and mobile applications so that customers are not tethered to the line itself, but register as part of a virtual queue, which alerts them when it is time for each to effectuate the transaction-whether coming to a physical sales counter, or a virtual one. As mentioned above, this will be referred to as transaction-based queueing.

Figure 6:
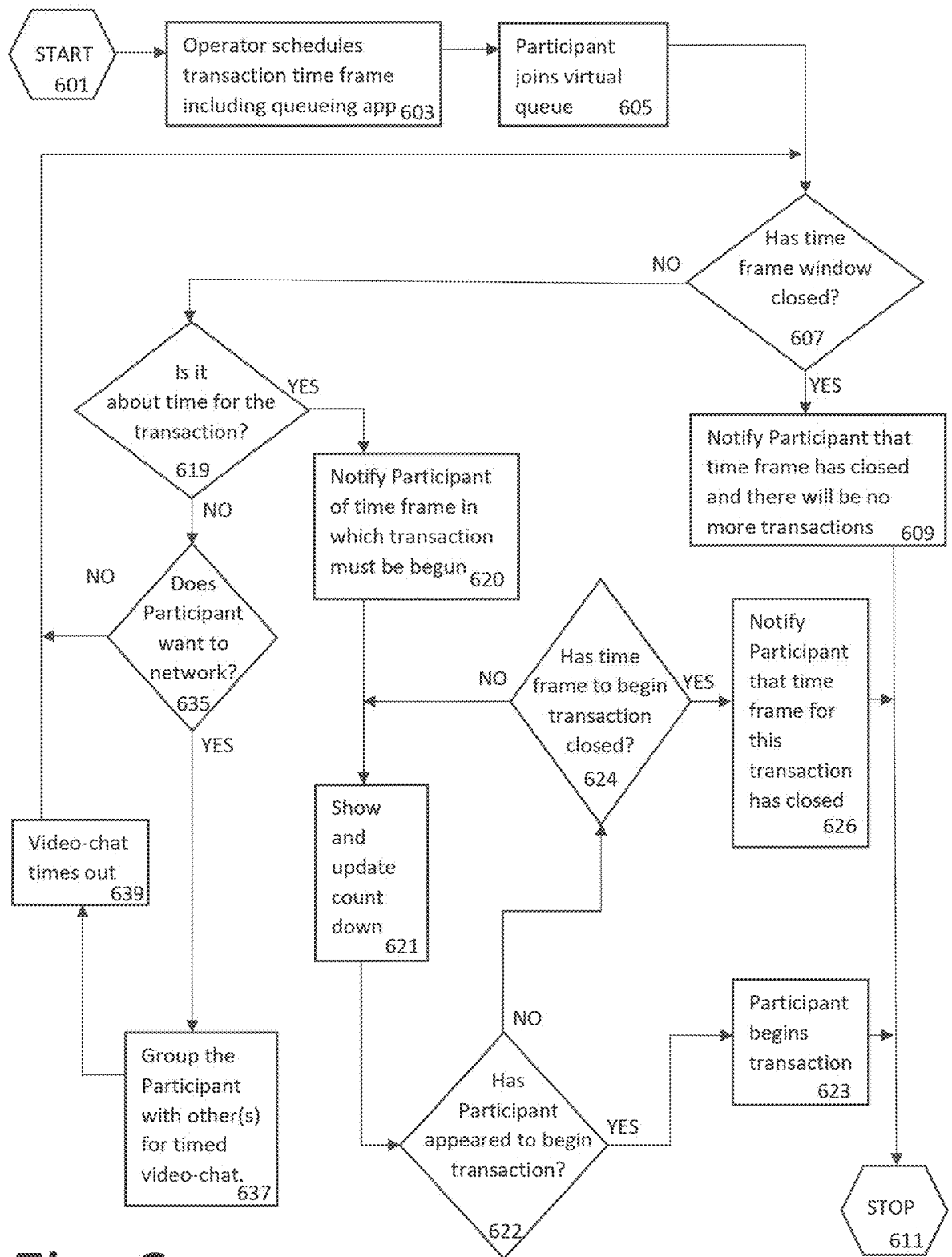
FIG. 6 is a flow chart with respect to a person's participation in an interpersonal pre-meeting networking session created in conjunction with a virtual waiting room that is associated with a transaction.

Consider now FIG. 6 which shows the process for a preferred embodiment which provides an interpersonal networking session on a transaction-based queuing application for a physical or online transaction, where the queue (i.e., the waiting buffer) comprises more people than can be serviced in the unit of time in a single production cycle—and where the queue persists for more time than a single production cycle.

The process starts (601) when the operator schedules the time frame in which the transaction can occur (603). For example, a ticket window at a multi-plex theater will be open on March 12, between 6:00 PM and 9:00 PM—or an online sale for rock concert tickets will be open during similar hours. A participant who wishes to engage in the transaction does not need to stand in a physical line, but must register for, sign in to, or join a virtual queueing application (605). The application may be built into the online webpage, or loaded onto the user's smartphone as an application. As known to those skilled in the art, it may reside on a user's computing device (including a smart phone) or reside in the cloud, and it may be written in a variety of different programming languages, with a variety of user interfaces. Participants may register at different times. When the user joins the queue (605), the application asks if the scheduled time frame has elapsed (607), that is, has the site stopped conducting transactions? If so, the participant is notified that the time frame has closed, and there will be no more transactions today (609). Then the process stops (611).

On the other hand, if transactions are still being conducted and processed (607), the process queries whether this particular participant is nearing the head of the line, and it's about time for the transaction (619). If not, the application interface asks whether the participant wants to network (635). If so, the application groups the participant with one or more other participants for a timed video chat (637). Methods of building video-chat into applications and webpages, designed for either desktop computers, smart televisions, or mobile computing devices (such as smart phones or smart watches), are known to those skilled in the art. When the video-chat times out (639), the process returns to decision point 607 and repeats. If at decision point 635, the participant does not want to engage in video-chat networking, the process returns to decision point 607 and repeats. While the participant remains in the transaction-based virtual queue, but is not engaged in video-chat, the queueing application may display other messages, images, or programming, as known to those skilled in the art of queueing software.

However, if at decision point 619, it is about time for the participant to engage in the transaction, then the application notifies the participant of the time within which he or she needs to begin the transaction (620). The point is that the participant's place in the virtual line is held for only a limited amount of time, within which the participant must begin (or in an alternative embodiment, complete) the transaction. Beginning the transaction could entail physical actions such as returning to the ticket kiosk to purchase the ticket from the ticket agent or returning to the amusement park ride entry to be admitted onto the ride attraction. However, if the transaction is online or virtual, beginning the transaction could entail focusing on the transaction computer window, or webpage in a browser tab; beginning to fill in or otherwise complete web-based forms (or software-monitored forms on a computing device); or submitting the transaction for completion.

When the application notifies the participant of the time frame in which to begin the transaction (620), the application also displays a countdown in the application interface (621), which is updated periodically. If the participant appears to begin the transaction within the time allotted (622) the participant begins the transaction (623) and the process stops (611).

On the other hand, the participant might not be able to begin the transaction right away. Walking back to the ticket kiosk may take some minutes. Saving work on another open computer program may take awhile. Consequently, if the participant has not appeared to begin the transaction (622), the application asks if the time to begin the transaction has closed (624). If so, the participant is notified that the time frame for the transaction has closed (626), and the process ends (611).

Returning to decision point 624, if the time to begin the transaction has not closed, the count down display on the computing device is updated (621), and this loop of 621, 622, and 624 continues until either the participant begins the transaction or the time frame closes.

In this way interpersonal networking via video-chat can be embedded in transaction-based virtual queueing applications.

In an alternative embodiment post-transaction networking is enabled. For a description of the post-transaction networking process (from a participant's point of view) see FIG. 5, and the discussion of it above, but change the word "meeting" to "transaction" in steps 503 and 505. That is, change step 503 to read: "A transaction (that has been scheduled to include post-transaction networking) ends and transitions to the networking session"; and change step 505 to read "Participant remains after transaction to join post-transaction networking."

C. Methods for Making Virtual Introductions During Networking Sessions

So far, the disclosure has focused on video-chat as a person-to-person networking tool. Another effective networking tool is introducing one person to another. It widens the network of each of the people introduced, but also deepens the network of the person making the introduction, by demonstrating his or her value to the others.

Methods of the present invention can be extended to having sideboard conversations (also referred to as "sidebar conversations") and making introductions by inviting people to a private breakout session (Slotznick patents '293 and '990); or by sending the people to be introduced an email.

Consider first some asynchronous implementations in which the introduction is sent, and then the people being introduced connect with each other later.

In a preferred embodiment, an "Email Introduction" button appears in the control interface during the networking session, or the session itself. When a participant presses or activates this control, an email is generated with a short pre-populated messages such as "XXX, I just met YYY, at the ZZZ session, and wanted to introduce you." The name of the session ("ZZZ") is also pre-populated from the system. The system offers a dropdown list of other participants in the networking session to populate "YYY", as well as a dropdown list of other people that the user has met or exchanged contact information with at the conference to populate "XXX". Exchanging contact information includes, but is not limited to, exchanging virtual business cards, exchanging LinkedIn addresses, or giving access to the profile feature of the meeting or networking platform running the networking or meeting session. Exchanging the contact information creates a database of contacts for this event, which are transitory, existing only for the duration of the event. The database is used to populate the dropdown list for the "XXX" term. In an alternative embodiment the database is not transitory, but persists for the user to access after the event is over. The method of creating such dropdown lists and databases is well known to those skilled in the art.

In a preferred embodiment, the system allows the person making the introduction to add additional text to the email. In an alternative embodiment, it does not.

Virtual introduction sessions can be built into the video-conferencing platform itself, similar to the virtual pre- and post-networking sessions described above. The introductions can also be conducted via a separate videoconferencing platform.

For example, instead of the above described "Email Introduction" button, the system displays a "Record Virtual Introduction" button. Activating that button (or control) starts to record video of the user making a video introduction, which is then automatically send (as a video email) to the participant not then present. In a preferred embodiment, the system displays a sample short introduction (as text on the screen) as a prompt which the person making the introduction is able to use like a teleprompter. In a preferred embodiment, the prompt resembles the email message described above. The person making the introduction is able to add additional introductory comments—or not. The purpose is to make the introduction with minimal interruption of the networking session. In a preferred embodiment, the video of the person from the networking session who is being introduced is also added to the recording. A prompt is shown on that person's screen, with words such as "Hi, I'm YYY, nice to meet you." In an alternative embodiment, the person from the networking session must agree to the introduction and/or video by activating a control. Drop down lists and/or voice recognition are used to identify to whom the video email is to be sent. Details of implementing audio and video email and messages are well known to those skilled in the art.

Consider now implementations of synchronous introductions, in which the people being introduced connect with each other during (at the same time as or concurrent with)

the video session in which the person making the introduction meets one of the people being introduced.

In the discussion below, note that a number of videoconferencing platforms, such as, but not limited to, Jitsi, Zoom, Microsoft Teams, Wonder, and Gatherly allow a videoconferencing session to be initiated by a URL link, with the videoconferencing platform accessed via and displayed on a web browser. Some videoconferencing platforms, such as, but not limited to, Zoom and Microsoft Teams, produce videoconferencing applications that reside on the individual computing devices of the end users accessing the videoconferencing sessions. Some (such as Zoom) allow clicking on a link to launch a browser-based version of the software if the user does not have the application installed on his or her computer, but instead launch the computing-device-based version of the application if it's on the computing device of the end user doing the clicking. In this way, sending a person a link (or URL) to a videoconferencing session gives that person (or any person receiving that link) a way to launch or join the session. In preferred embodiments of the present invention described below, when a link is sent to one or more third-party contacts (or invitees) to set up an introduction to the person or persons with whom a user is currently video-chatting or networking, the link is also copied to the user and the person(s) with whom the video user is networking. That way, all of these parties can join a new video-chat introduction by clicking on the link. In an alternative embodiment, the videoconferencing platform on which the user is video-chatting and networking with those other person(s) opens a video-chat session as a separate session or breakout room (the "new session space"), sends their current video feeds to that new session space, creates a link (URL) for that new session space, and sends that link only to the contact person(s) invited to the introduction. In any event, the introduction consists of a video-chat in which (a) the user, (b) those with whom he or she has been actively networking in a video-chat session, and (c) the invited contact(s) are able to engage in a video chat together.

As described above, in a preferred embodiment, the videoconferencing session for the introduction is separate from the videoconferencing networking session (or breakout room) for the video-chat networking. Consequently, the new separate session persists even when the networking session times out (such as when the system creates new groups to engage in round-robin sessions of networking video-chat). In an alternative embodiment, the videoconferencing platform creates a new URL linked to the current networking video-chat conversation (or breakout room) in which the user is engaged, so that inviting the contact(s) to be introduced sends the invitee(s) the link to join this specific video-chat (breakout room). When the networking session times out and the system creates new video-chat sessions with new groups of people, the introduction session no longer persists. While the user and those to whom the user had been video-chatting are re-assigned to a different networking session, the invitee's video feed is disconnected from the networking sessions.

As known to those skilled in the art, use of a virtual camera allows a user to send the same video feed to two videoconferencing sessions or streaming platforms at the same time. For example, one session may be the networking video-chat described above and the second session may be the introduction video-chat described in this portion of the disclosure. In a preferred embodiment, the networking video-chat session and the introduction video-chat session use a virtual camera to send the same video feed to both sessions. In an alternative embodiment, during the introduction video-chat, the videoconferencing platform supporting the networking video-chat switches the camera accessed by that platform to be a blank (or "null" or "empty") video feed from a defined "null" camera, while the introduction session uses the original video feed. A "null" camera is defined as a virtual camera with no video feed. In a preferred embodiment, it is designed to require minimum use of computer processing resources. In an alternative embodiment, it shows a still image as a placeholder. At the conclusion of the introduction or the underlying timed networking session, whether accomplished manually or automatically when the networking session times out, the videoconferencing platform supporting the networking video-chat switches the camera accessed by that platform back to the previously used video feed, and switches the introduction session to a blank video feed from a null camera. In some instances, this use of a null virtual camera may reduce system video processing or networking loads and also improve video-chat performance.

In current practice (prior art), some platforms may not permit a video feed from any camera, including a virtual camera, to be directed to or sent to more than one instantiation of an application (or category of applications). In such circumstances, the use of a defined null camera—and switching between another named camera (or virtual camera) and the null camera-provides a workaround for alternative embodiments of the present invention.

Figure 7A:
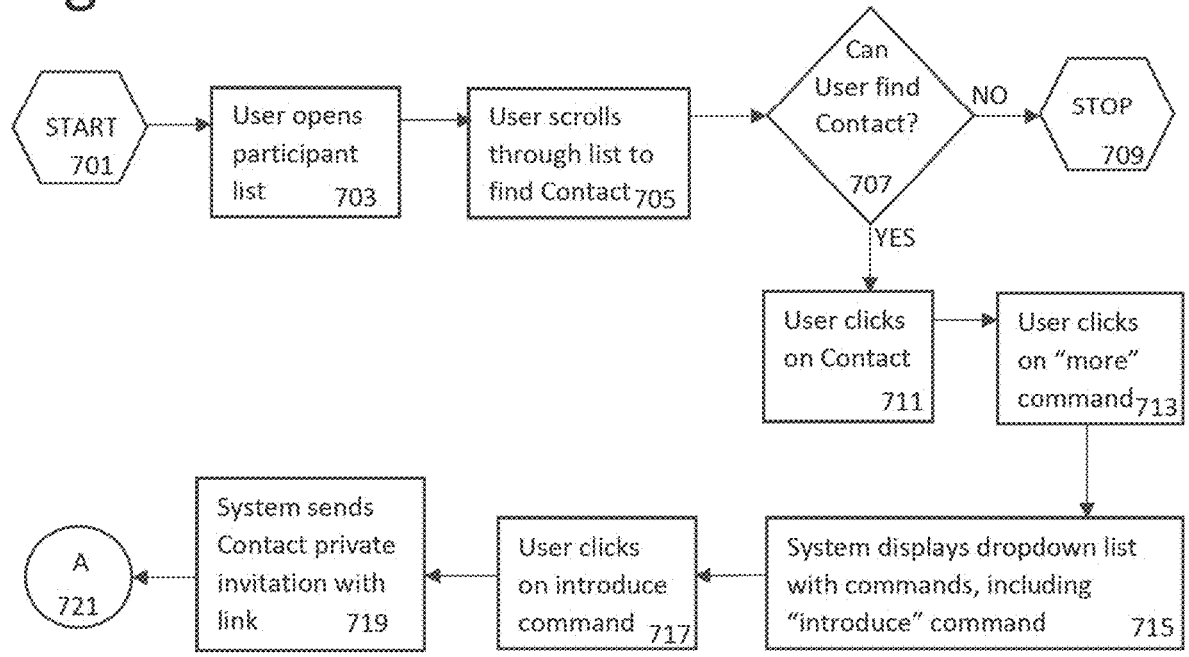
FIG. 7A shows a flowchart of the process in a preferred embodiment of the invention by which a user who has met another person in a videoconferencing session, prepares to introduce that other person via video-chat to a third person who is a previous contact of the first person, by manually searching the list of participants in the videoconferencing session for the name (and listing) of that third person and then sending an electronic invitation to the third person to meet for an introduction via video-chat.
Figure 7B:
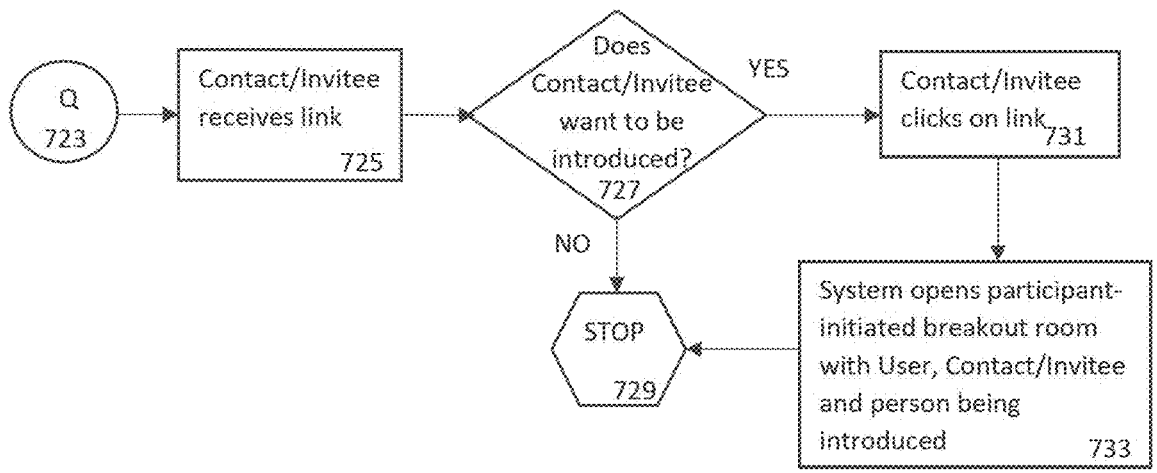
FIG. 7B shows a flowchart of the process in a preferred embodiment of the invention by which a person who has been electronically invited to be introduced to another person responds to the invite.

FIG. 7A and FIG. 7B show a preferred embodiment of such virtual introduction emanating from a small-group video-chat networking conversation described previously. (This embodiment employs Slotznick patents '293 and '990 which teach methods of participant-initiated videoconferencing sessions, either embedded within a videoconferencing platform, or accessed independently of the platform.) In the following and previous discussions, the term "clicks on" with respect to a command, button or control, indicates that the user activates (or causes the computing device to execute) that command, button, or control.

The activation can be via mouse click, but can also be by any other method of activation known to those skilled in the art, including, but not limited to, other pointing devices, keystrokes, hotkey, touching a touch pad, touching a touch screen, sound, or voice.

Consider first FIG. 7A which begins after a user meets another person in a videoconferencing session-a person who the user then decides to try introducing to a third person. This attempt at the introduction process starts (701) when the user opens the participant list in the videoconferencing interface (703). Zoom, for example has a "Participant" control button usually at the bottom of the Zoom application window which opens an adjacent window listing all participants. This listing includes some status information about each of the participants (e.g., whether a participant is a host, co-host, or panelist, whether a participant is muted or not, or has video turned on or off), as well as controls by which a user can access commands with respect to the participant and the participants video feed (which commands depend upon the user's own status). Other videoconferencing platforms such as Gatherly provide access to participant lists via differently labeled (or differently positioned) controls. Returning to FIG. 7A, the user then scrolls through the participant list (705) until the user finds the name of the third person (the user's "contact"). If the user cannot find the contact listed (707), the process stops (709), and the user cannot make the introduction using this method. However, if the user finds the name of the contact (707), the user clicks on the contact's name (711) and then clicks on a "more"

command associated with that name (713). The "more" command might be labeled differently, such as with a " . . . " icon (an ellipsis). The system displays a dropdown list with available commands, including an "introduce" command (715). (Alternatively, if the platform's user interface has sufficient display space, steps 713 and 715 are combined by showing all available commands. Alternatively, the commands are displayed when the user mouses over a participant's name or right-clicks on the name.) Then the user clicks on the introduce command (717) and the system sends the contact a private invitation with a link to a participant-initiated breakout session (719) per Slotznick patents '293 and '990.

In an alternate embodiment, the "introduce" command is given a different name, but with the same or similar function.

As known to those skilled in the art, the link may be displayed as a clickable URL, or may be a hyperlink embedded into a virtual button or control, or may be a command within the platform to open a video-chat session with specified participants. As also known to those skilled in the art, the invitation may be sent via a direct text-chat message within the videoconferencing session, a text-chat message within the broader conference platform, a platform-created pop-up window, a text-chat message via out-of-platform applications, or otherwise.

In a preferred embodiment, the invitation includes mention of both the user and the person the user has just met, such as, but not limited to: "Your friend User X would like to introduce you to a Participant Y. If you would like to accept the invitation to video-chat now, please click on link Z." Alternatively, the invitation may be more or less expansive, with or without mention of X or Y. Alternatively, the message includes (a) contact information for Participant Y and (b) a control (with appropriate wording) so that the contact/invitee can politely refuse the invitation and send a return message, while accepting the contact information of Y, such as (but not limited to): "I'm in a meeting now, but will try to get back to Y later."

In a preferred embodiment, the invitation is generated automatically by the system, and then automatically sent to the contact/invitee. In an alternative embodiment, this message—after being automatically generated—is first displayed in editable form to the user, so that the user can add a personal touch to the message. Likewise, in a preferred embodiment, any response message by the contact/invitee to the user's invitation is automatically generated by the system and then automatically sent to the user. In an alternative embodiment, this message—after being automatically generated—is first displayed in editable form to the contact/invitee, so that he or she can add a personal touch to the message.

In a preferred embodiment, the invitation can be sent only to contacts within the particular videoconferencing session-perhaps to someone the user just met. In an alternate embodiment, the invitation can be sent to any contact within the larger conference or event. In Gatherly, for example, a user can send a text message to anyone attending the event and search the entire event for people or search a subset of them (i.e., just one "floor" in Gatherly's spatial view within a multistory building paradigm). In an alternative embodiment, this invitation can be sent to anyone on the user's personal contact list.

After step 719, the process proceeds through node A (721) to FIG. 7B, via node Q (723). At this point (725), the contact/invitee receives the invitation with the link. If the contact/invitee does not want to be introduced (727) the process stops (729). In a preferred embodiment, the contact/invitee declines the invitation by just ignoring the message (with the link). In an alternative embodiment, the message disappears after a set time if ignored. In another alternative embodiment, the message includes a control or button by which the contact/invitee is able to affirmatively decline the invitation.

In yet another alternative embodiment, people/participants/attendees set a preference whether to automatically decline (or accept) such invitations, or whether such an invitation is shown so that the person/participant/attendee can decide at that moment whether to accept or decline the invitation. (Sometimes in preference settings this is referred to as electing to "manually" as opposed to "automatically" making the choice.) It is known to those skilled in the art how to create user interfaces to record, store, and access such preferences, as well as incorporate retrieval of such preferences into processes such as FIG. 7B.

Returning to decision point 727. If the contact/invitee wants to be introduced, he or she clicks on the link (731) or activates the control in which the link is embedded. The system then opens a participant-initiated breakout room (733), which serves as a video-chat session in which the user can introduce the contact/invitee to the person the user just met—and the process stops (729). As discussed above, these individuals (consisting of at least three people) continue their discussion in the participant-initiated breakout room.

Figure 7C:
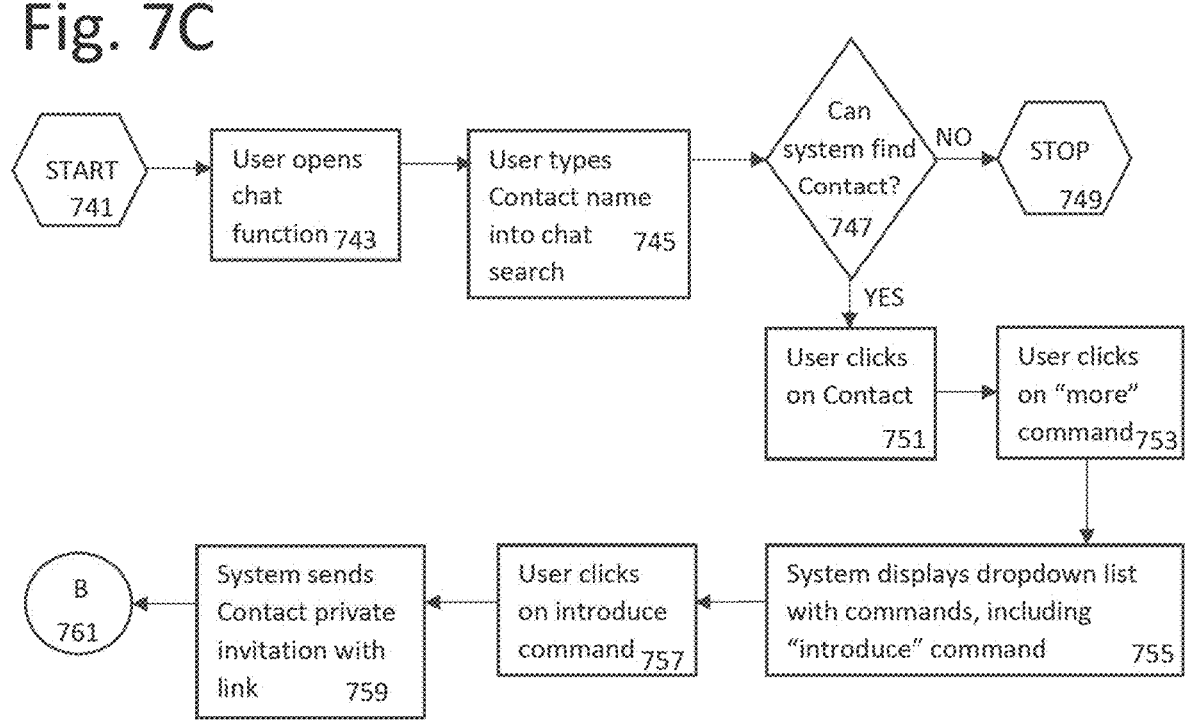
FIG. 7C shows a flowchart of the process in an alternative embodiment of the invention by which a user who has met another person in a videoconferencing session, prepares to introduce that other person via video-chat to a third person who is a previous contact of the first person, by using a search function in the text-chat feature of the videoconferencing session for the name of that third person and then sending an electronic invitation to the third person to meet for an introduction via video-chat.

In an alternative embodiment, the user does not search for the contact via the participant list, but rather uses a search function built into the platform, for example, in an in-platform text-chat feature. This is illustrated in the flowchart of FIG. 7C. Zoom, for example has such a search feature, that becomes visible in the text-chat window, after the window is activated by a chat control in the lower portion of the Zoom application window. Gatherly, in contrast, has its search function incorporated into its participants (people) list-which is built into its text-chat feature (with controls at the right and lower right parts of the screen). Other platforms may have the people search function associated with a different part of the user interface.

To illustrate use of a people search function, consider FIG. 7C where the search function is part of the platform's text-chat feature. FIG. 7C starts (741) when the user opens the chat function in the videoconferencing interface (743). The user then types the contact's name in the search (745). If the search function cannot find the contact listed (747), the process stops (749), and the user cannot make the introduction using this method. However, if the search function finds the name of the contact (747), the user clicks on the contact's name (751) and then clicks on a "more" command associated with that name (753). The "more" command might be labeled differently, such as with a " . . . " icon (an ellipsis). The system displays a dropdown list with available commands, including an "introduce" command (755). Alternatively, the commands are accessed by mousing over the contact's name, or right-clicking on the name shows the list of commands. Alternatively, if the platform's user interface has sufficient display space, steps 753 and 755 are combined by showing all available commands. The user then clicks on the introduce command (757) and the system sends the contact a private invitation with a link to the participant-initiated breakout session (759) per Slotznick patents '293 and '990. As discussed above in respect to step 719 of FIG. 7A, the invitation message may take on different forms in alternative embodiments.

As is known to those skilled in the art, and without loss of generality, appropriate modifications to the description of this process are easily made when the search function is part of another feature of the platform (such as a participant list) rather than part of the text-chat feature.

After step 759 of FIG. 7C, the process proceeds through node B (761) to FIG. 7B, via node Q (723). The process then follows FIG. 7B as discussed above.

Figure 7D:
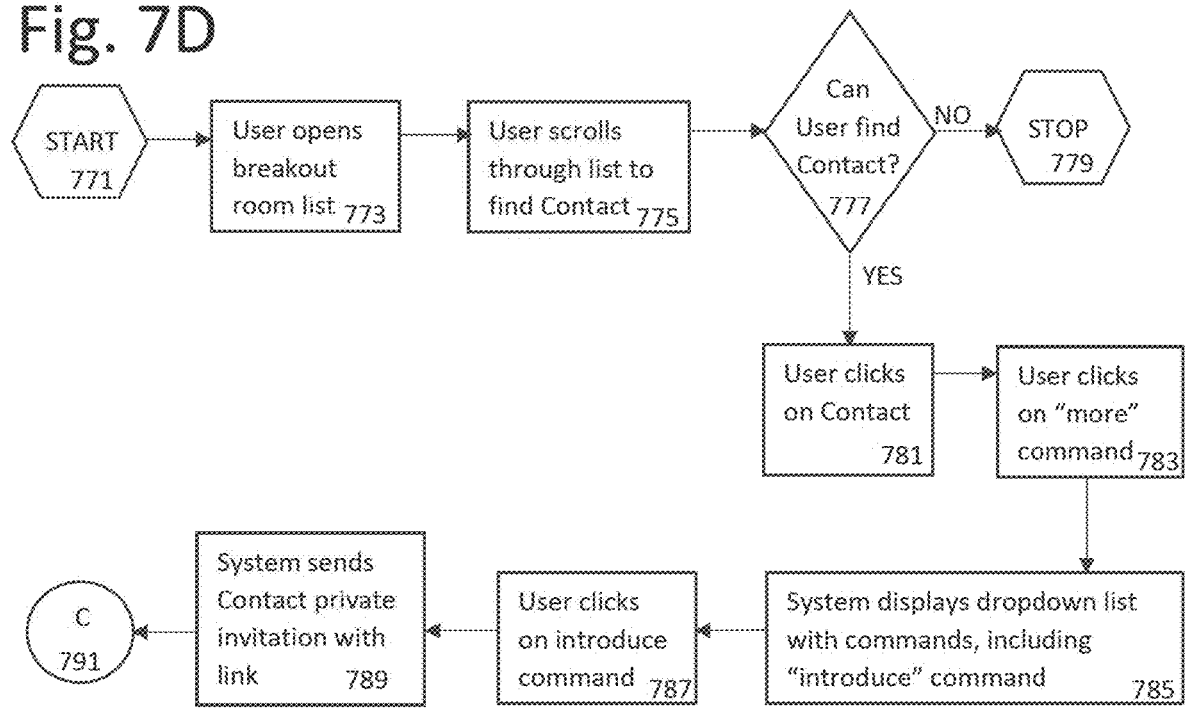
FIG. 7D shows a flowchart of the process in another alternative embodiment of the invention by which a user who has met another person in a videoconferencing session, prepares to introduce that other person via video-chat to a third person who is a previous contact of the first person, by manually searching the listing of participants in breakout sessions of the videoconferencing session for the name of that third person and then sending an electronic invitation to the third person to meet for an introduction via video-chat.

In an alternative embodiment, the user does not search for the contact via the participant list, but rather uses the breakout room listing. This is illustrated in FIG. 7D. In Zoom, for example, clicking on a breakout room control will (when permitted by the host) show a pop up window with all the breakout sessions, and which participants are in each. Other applications or platforms show networking pairings, or grouping differently. Gatherly, for example, allows a user to see the participants either listed by floor or displayed in spatial view by floor.

Consider now FIG. 7D where the breakout rooms (conversation circles, or video-chat groups) are listed upon activation of a control function (as in Zoom). FIG. 7D starts (771) when the user opens the breakout room function in the videoconferencing interface (773). The user then scrolls through the list to find his or her contact (775). If the user cannot find the contact listed (777), the process stops (779), and the user cannot make the introduction using this method. However, if the user finds the name of the contact (777), the user clicks on the contact's name (781) and then clicks on a "more" command associated with that name (783). The "more" command might be labeled differently, such as with a " . . . " icon (an ellipsis). The system displays a dropdown list with available commands, including an "introduce" command (785). Alternatively, the commands are accessed by mousing over the contact's name, or right-clicking on the name shows the list of commands. Alternatively, if the platform's user interface has sufficient display space, steps 783 and 785 may be combined by showing all available commands. The user then clicks on the introduce command (787) and the system sends the contact a private invitation with a link to the participant-initiated breakout session (789) per Slotznick patents '293 and '990. As discussed above in respect to step 719 of FIG. 7A, the invitation message may take on different forms in alternative embodiments.

After step 789 of FIG. 7D, the process continues through node C (791) to FIG. 7B, via node Q (723). The process then follows FIG. 7B as discussed above.

The discussion above considers embodiments in which a user introduces the people with which he or she is conversing to a single third party. In an alternative embodiment, the user sends invitations to multiple third-party contacts, iteratively or simultaneously. For example, this would be how a user introduces a person he or she met to two co-authors of a paper, or to several co-owners of a company.

The discussion above has focused primarily on videoconferencing platforms that do not present a spatial view of the meeting session or the event. Some platforms, including Gatherly and Flymachine, allow the user to see not only the video feeds of the people with whom the user is in a conversation, but also avatars or video feeds of other participants arranged in a spatial view. In a number of spatial-view platforms, when a user clicks on the avatar or video feed of another participant in spatial view, the user is moved out of the conversation in which he or she has been engaged, and into proximity (and conversation) with the person whose avatar or video feed has been clicked on by the user.

The present invention implements a different paradigm. Right clicking on the avatar or video feed of another participant which is not in a user's conversation circle, causes the system to display a list of possible commands or actions, one of which is "introduce". Clicking on, or otherwise activating, the "introduce" command sends this other participant a private invitation with a link to a participant-initiated breakout session (per Slotznick patents '293 and '990) with the user and the others with whom the user is currently in a video-chat conversation circle.

As known by those skilled in the art, the "introduce" command may be named, labeled, accessed, or activated differently.

The personal rewards to networking and increasing one's network are obvious. Less obvious are the rewards that come from introducing people to others, especially when introducing a person one has just met. What introductions do is both broaden a network and create denser ties within the network, making it more robust and more valuable. This not only increases the value of an introducer's network, but also demonstrates the value of the introducer to those in his or her network. Conferences or events which create more robust and valuable networks are themselves more valuable to those who attend them.

In a preferred embodiment of the present invention, the videoconferencing platform not only permits and facilitates introductions as described above, but also stores in memory the number of introductions made by each participant, as well as the efficacy of that introduction gauged by a variety of metrics such as (but not limited to) the number of additional introductions emanating from a given introduction, as well as the quality and networking connectivity of those introduced (gauged by other metrics known to those skilled in the art, including, but not limited to, ratings of the quality of the introduction by those who have been introduced). The embodiment then "gamifies" introductions. A variety of rewards are employed to incentivize participants to introduce the people they meet to others in their network, through methods known to those skilled in the art. These methods include, but are not limited to, virtual rewards (with recognition on a leader board or via virtual stickers), peer recognition, monetary rewards (with redeemable points, awards of money, or specific prizes), personal rewards (including meeting virtually or physically with a celebrity, social media influencer, or known expert in a field), or career enhancement (including being given a promotion, a more prestigious job title, or a place on an industry committee).

A typical speed networking session (with multiple rounds) lasts up to an hour, and a participant averages 7 to 10 contacts when "round robin" pairings are utilized (see https://en.wikipedia.org/wiki/Speed_networking). The number of individual contacts may increase for group-based networking events, however, this number of contacts remains limited by the goal of promoting quality contact conversations and participant cognitive load (for some, meeting too many new people at one time results in none being remembered). Within a larger group, algorithms for matching people for purposes of networking which are based on best fit of their profiles, may introduce the same dozen people to each other during a networking session-one pair at a time-even in a meeting with hundreds of participants. While this helps foster a small dense network of contacts, there are other possible contrasting goals. Consider especially a networking event that is sufficiently large so that any participant will make contact with only a small portion of the total participants during the event. Consider also a networking event which contemplates supplementary serendipitous intra-participant introductions that are outside the matching algorithm (such as described above). In addition, consider the networking that occurs over the course of a conference with multiple networking events.

A preferred embodiment of the present invention pairs (or groups) participants for each networking session according to a shortest path algorithm (as known by those skilled in the art) that broadens the network to minimize the "shortest widest path" from any participant to any other. Like "six degrees of separation" notions, the idea is to create a network where each person has a path to reach any other person in the session (or conference) through the people he or she has met at the session—and via the shortest possible path. (See for example: https://en.wikipedia.org/wiki/Network_theory, https://en.wikipedia.org/wiki/Shortest_path_problem, and https://en.wikipedia.org/wiki/Widest_path_problem)

Using this embodiment magnifies the reach and power of unplanned intra-participant introductions, thereby strengthening the organic development of networks fostered by the networking sessions.

Notice that this embodiment does not require storing information about pairings or groupings beyond the networking session itself. An alternative embodiment stores contact data (such as, but not limited to, who met whom during a networking session or intra-participant introductions) over the course of multiple sessions. Then, over the course of these multiple sessions, network optimizing algorithms are used to minimize the shortest widest network path among these multiple-session attendees.

The disclosure above has taught ways to create small sub-groupings of people from among those signing on to attend a virtual meeting, either before the meeting or after the meeting, in order to promote interactions among people who might not know each other but have the common interest of attending that meeting. The above disclosure has also taught ways to extend the contacts created by these interactions, by enabling participants to introduce people they have just met (via the platform) to other participants who might not be scheduled to attend this particular meeting.

In contrast to the disclosure above, the "virtual hallway" of U.S. Pat. No. 11,803,817 (Shiner) is intended to promote interactions among people who may know each other and who happen to have virtual meetings scheduled for approximately the same time but are themselves not scheduled to attend the same meeting.

However, it is well known to practitioners of the art, including those who run meetings, that gathering participants together for a meeting or small breakout group (as a subset of the meeting) is often insufficient by itself to sua sponte generate meaningful interactions and conversations. That may be especially true when the participants are strangers. Rather, generating meaningful conversation and interaction often requires a trained moderator or facilitator. The skilled moderator may introduce ideas or ask the participants questions in order to draw them out, as well as calling directly on each participant so that all participants contribute to the discussion. The trained moderator may follow similar prompts and queries prepared by the meeting organizer. However, providing enough skilled or even trained people to act as facilitators can be very labor intensive. For example, if small pre-meeting or breakout groups consist of two or three non-moderating participants, then ¼ to ⅓ of all attendees at a session will be facilitators.

Current strategies for promoting discussion in breakout rooms often rely upon self-regulated conversation among the participants, with automated strategies limited to (a) posting text questions (often called "icebreakers") for each member of the group to volunteer an answer, and (b) showing a countdown clock until the next breakout room forms, with the intent of encouraging participants to dive in with quick responses. Such strategies are employed by Twine, mentioned above.

One preferred embodiment of the present invention adds virtual facilitators (alternatively referred to as "virtual moderators") to the mix, powered by text-to-speech and artificial intelligence (AI). (These virtual helpers may mimic or appear similar to voice assistants such as, but not limited to, Apple's Siri, Microsoft's Cortana, Google Assistant, or Amazon's Alexa.) These facilitators do not just speak out loud the text "icebreakers" prepared by the meeting organizer. They also call on each individual participant by name to provide a response. (The platform requires each participant to give his or her name when registering for a session and then most often displays that name in a corner of their thumbnail video, as if it were a name badge.)

In one embodiment, the virtual facilitators use a text-to-speech program to convert a set of text icebreakers into a conversational gambit. The text icebreakers, written before the meeting by its planners, are stored (like survey questions) on the meeting platform, along with the registered participant names. For example, instead of just speaking an icebreaker ("What is your favorite invention?"), the virtual facilitator appends the name of one of the participants in the session (such as, "Mary, what is your favorite invention?"). This is a way to ensure that all participants contribute to the discussion.

In an alternative embodiment the virtual facilitators use simple scripts to alter the way an icebreaker is asked to each participant, to achieve the same result, but with more natural conversation flow. For example, the virtual facilitator first asks one person "Mary, what is your favorite invention?"; then after Mary answers or the amount of time for her answering runs out, the virtual facilitator asks a second person, "Joe, do you agree with Mary, or do you prefer something else?" The construction of algorithmic programs to create lifelike chatbot responses within simple conversations is well-known, as is transforming the text response to speech using text-to-speech engines.

In another alternative embodiment the virtual facilitator does not use generic icebreakers, but leverages the fact that the participants have registered to attend a particular meeting session on a specific topic. Of course, there are general icebreaker questions related to this fact such as, "What do you expect to learn from this session?" But there are also icebreaker questions related to the specific topic that the session speaker and organizer formulates. Examples include establishing level of familiarity with a topic in a general manner ("Which web app frameworks have you used?") or the queries can be more specific ("Have you used the web app framework Ruby on Rails?" or "How many years/projects have you used Ruby on Rails?").

The platform can capture the answers using speech recognition and store the answers for future reference in the current session, the current meeting (which may have both pre and post sessions), or the current multi-meeting conference. This is in addition to any information that the participant has provided on their event profile. Note that answers to the more general question can be used by AI to generate the more specific questions.

As described above, the platform creates a series of short sessions as part of a pre-meeting gathering, each session consisting of a number of simultaneous sessions (e.g., breakout sessions), and each session having a small number of participants. At the end of one session the platform creates a new set of simultaneous sessions with a different partition of the total set of participants so that there are different participants in each of the simultaneous sessions than in the prior set of sessions. In a preferred embodiment, this re-partitioning is done via a pre-set process (which as described above is random, algorithmically driven, or determined by participant choice). In an alternative embodiment, the process applies artificial intelligence (AI) to the answers given by all of the participants in one session's set of icebreakers to assign participants to small groups for the next set of sessions.

For example, the process might assign participants who have a similar level of familiarity with the topic as pairs, triads, or small groups for the next sessions. Alternatively, if a participant indicates that he or she is attending the session in order to learn enough to hire an expert in the field, the process may assign that person to a session with another person who has indicated sufficient familiarity to qualify as an expert. The purpose of the virtual facilitator is not only to generate conversation among participants and prime them to get more benefit from the upcoming meeting presentation, but to make introductions and help participants create useful networks.

Questions asked by a virtual facilitator in a virtual hallway would be different. Here, the object is to "introduce" people (and their ideas) at one enterprise, who are working on one kind of project, to the expertise and ideas of others at the enterprise who are working on different projects, with the purpose of uncovering unexpected synergies in different approaches.

As an example, after the platform's match engine groups people together who are not in the same department, and not working on the same project, the virtual facilitator might query, "Mary, what project are you working on? What are you trying to achieve? And what methods are you using to find a solution?" Then the virtual facilitator might query, "Joe, what methods and procedures are you currently using that might be applicable to Mary's project?" The virtual facilitator for a virtual hallway has its AI chatbot program built to present queries known to those skilled in the art of group facilitation to build teams for current projects among those with different skill sets. This is in contrast to the queries of a virtual facilitator in a trade conference pre-meeting session, where the virtual facilitator is programmed to find and nurture networks among strangers with potential for future collaboration.

While the discussion has focused on the use of virtual facilitators during pre-meeting sessions, an alternative implementation uses virtual facilitators during the meeting itself, particularly in breakout sessions. Alternate implementations use virtual facilitators during post meeting sessions, or in the virtual lobbies and virtual hallways that separate an institution's or event's various meetings and webinars.

Returning now to the concept of introducing conference participants, the AI powering the virtual facilitator (with access to both the conference participants' profiles, and the response of participants to its queries) considers whether participants may benefit from being introduced to others in the conference who are not in that particular meeting. The virtual facilitator then asks if a first participant in one of its sessions wants to be introduced to a second person at the conference not in that session (e.g., "Mary, would you like to be introduced to Gary, who is at this conference, but not this meeting? He has a similar skill set as you"). The introduction can happen in the background, during the course of the current meeting, or after the current meeting.

In a preferred embodiment, the virtual facilitator would make the introduction or pose queries, as if the virtual facilitator was a participant, using text-to-speech driven audio. In an alternative embodiment, the virtual facilitator would also be represented by an avatar (still or animated). In another alternative embodiment, the virtual facilitator interacts with users via text chat.

Notice that the platform not only has information about each participant that the participants may have provided before the meeting, but has gained more information from their answers to the virtual facilitator's questions. This enables the AI inferences about who should be introduced to whom.

Previously this disclosure taught how a participant can introduce one person he or she just met virtually during a session, to another person at the conference. In an alternative implementation the participant who wishes to make the introduction can ask the virtual facilitator to make the introduction.

Part of the purpose of pre and post meeting networking is to gather contact information of the people one meets. When a user registers for, or signs on to, a meeting, the platform asks whether the user wishes to share his or her contact information with those the user virtually meets. After such a virtual meeting, the virtual facilitator forwards the contact information, along with a notation of where the meeting occurred (date, time, session, etc.). If given permission by a user, the virtual facilitator forwards the additional information that the virtual facilitator learned about the user in the course of queries and responses during the session. This permission can be obtained before the event, before the meeting, during the session, or after the meeting. Permission can be granted by a verbal acknowledgment, or by pressing a virtual button on the interface. In an alternate embodiment, the AI associated with the virtual facilitator annotates the contact information with when the meeting occurred and the topic of the virtual meeting.

Figure 11:
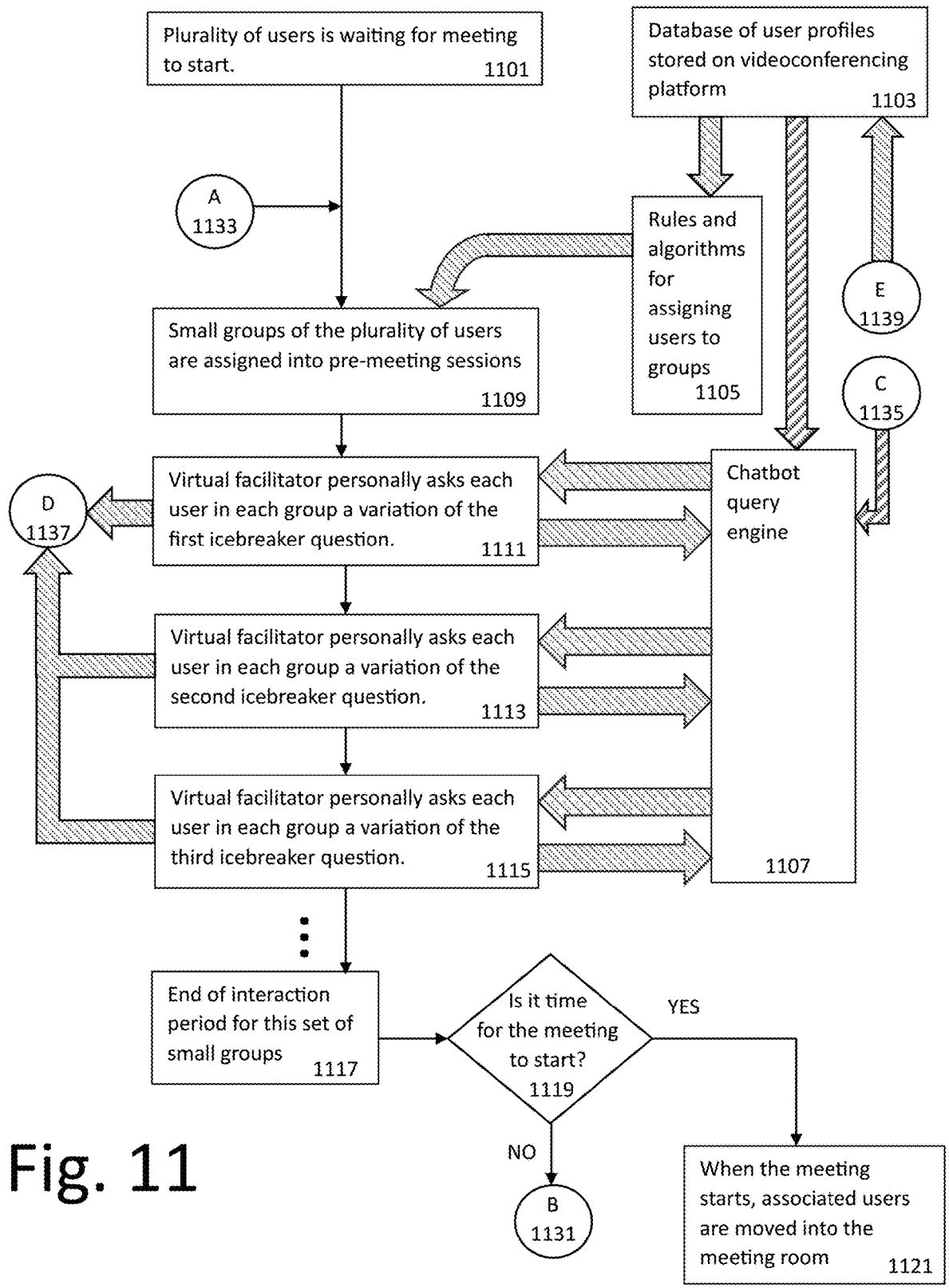
FIG. 11 is a flowchart of use of a virtual facilitator in the context of pre-meeting sessions.

Consider now FIG. 11, which shows a flow chart that examines the use of a virtual facilitator, in the specific context of pre-meeting sessions.

As the process starts before a meeting for which users have registered, a plurality of users has logged on to the videoconferencing platform and is waiting for the meeting to start, 1101—and these users have filled in a profile which includes at least their names and email addresses for identification purposes, 1103. The profile may allow users to provide additional information about themselves to assist with networking.

Consider those users who are available for pre-meeting sessions. This is a required component for attending the meeting in some cases, but may be an option for others.

As discussed above, the organizers of the meeting have a number of ways to assign users to pre-meeting sessions. Assignments may be random, rules-based, or algorithmically determined based on user profiles. (As noted previously, in other cases the assignments may be user-chosen.) The profile data, 1103, informs the matching engine (also called the grouping engine) 1105. In some implementations, it also informs the chatbot query engine (1107) that generates icebreaker questions and comments for the virtual facilitator to speak to users.

Once a plurality of users has joined the platform and is waiting for the meeting to start, 1101, the next step in the pre-meeting session is the formation of small groups of users for discussion and interaction, 1109. The small groups are chosen by the matching engine, 1105.

The narrow black arrows between blocks show the process as experienced by the users. The wider arrows filled with shading show the data flows that inform both the matching engine (1105) and the chatbot query engine (1107).

Once the small groups are formed, 1109, the virtual facilitator asks each user a first icebreaker question, 1111, informed by the chatbot query engine, 1107. Each user's answers are converted to text and sent back to the chatbot query engine, 1107, to inform future queries and comments by the virtual facilitator. Each user's answers are also sent to the database of user profiles, 1103 (via node D, 1137, and node E, 1139). The database sends the augmented profiles to the matching engine, 1105 to inform future matching engine choices.

After all users in a group have been asked the first icebreaker question, 1111, the virtual facilitator asks each user a second icebreaker question, 1113, informed by the chatbot query engine, 1107. Again, each user's answers are converted to text and sent back to the chatbot query engine, 1107, as well as the database of user profiles, 1103.

After all users in a group have been asked the second icebreaker question, 1113, the virtual facilitator asks each user a third icebreaker question, 1115, informed by the chatbot query engine, 1107. Again, each user's answers are converted to text and sent back to the chatbot query engine, 1107, as well as the database of user profiles, 1103.

In a preferred embodiment, the virtual facilitator asks each user three questions, but in alternate embodiments the virtual facilitator asks more or fewer questions. That is because users may take more or less time to answer the icebreakers, and the end of the interaction period is set at a specific lapsed time rather than a specified number of questions. At the end of the interaction period for this set of small groups, 1117, the process checks if it is time for the meeting to start, 1119. If so, the meeting is started and the users are moved into the meeting room, 1121-ending the pre-meeting sessions.

However, if it is not yet time to start the meeting, the process starts with a new and different set of small groups. The process returns to 1109 via nodes B, 1131, and A, 1133. At the same time, a counter in the chatbot query engine, 1107, is advanced via node B, 1131, and C, 1135, so that programmed changes to the queries for the second round of networking can be implemented.

Both the matching engine 1105 which determines which users are in the small groups, and the chatbot query engine, 1107 which determines which questions each is asked, have augmented information from the database of user profiles, 1103, based on users' answers to the virtual facilitator icebreaker questions.

Thus, for a second pre-meeting session (including 1109, 1111, 1113, 1115, to 1117) the virtual facilitator adds comments when appropriate to the icebreaker questions based upon how the users have been grouped or what the users previously answered to the icebreakers. For example, a virtual facilitator might preface the next session with Jack and Jill, with a comment, "Both of you have indicated a similar skill set and years of experience with the meeting topic." Then, start the second set of icebreakers. In this manner, even though session participants are differently grouped, their conversation can build on the previous interactions.

Again, after the end of the interaction period for this set of small groups, 1117, if it is time to start the meeting, 1119, the users are moved into the meeting room, 1121. Otherwise, the process repeats through another pre-meeting session with augmented user profiles and data to inform the matching engine and the query engine.

In a preferred embodiment, the length of the interaction period for each session is the same. In an alternative embodiment, they differ based upon whether it is the first, second, or subsequent set of interactions, so that queries that help the matching engine are asked first, and more substantive queries are subsequently asked.

While this discussion and FIG. 11 have focused on using virtual facilitators for pre-meeting sessions, and introductions, similar virtual assistants can be deployed for facilitating and moderating post-meeting sessions, meetings themselves, or in-meeting breakout sessions, using methods known to those skilled in the art.

It should be appreciated by those skilled in the art that various modifications and variations may be made to the present invention without departing from the scope and spirit of the invention. It is intended that the present invention include such modifications and variations as come within the scope of the present invention.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for allowing meeting participants of a host-scheduled videoconferencing session to interact with each other via an online meeting user interface of a videoconferencing system using their respective participant computers prior to initiation of the host-scheduled videoconferencing session, wherein the computer program product comprises non-transitory computer-readable media encoded with instructions for execution by a processor (or computing device) to perform the methods described above. More specifically, the videoconferencing systems and platforms described above are implemented using one or more of such processors or computer systems.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

What is claimed is:

1. An automated method for allowing meeting participants of a host-scheduled videoconferencing session to interact with each other via an online meeting user interface of a videoconferencing system using their respective participant computers prior to initiation of the host-scheduled videoconferencing session, wherein the meeting participants request to join the host-scheduled videoconferencing session by sending a request to the videoconferencing system from their respective participant computers, and wherein the videoconferencing system provides a waiting room for the meeting participants to be placed in prior to the initiation of the host-scheduled videoconferencing session, the method comprising:

(a) electronically clearing meeting participants to participate in the host-scheduled videoconferencing session, by the video conferencing system, who have requested to join the host-scheduled videoconferencing session, wherein cleared meeting participants automatically join the host-scheduled videoconferencing session upon its initiation via their respective meeting participant computers, and wherein cleared meeting participants are in the waiting room prior to the initiation of the host-scheduled videoconferencing session;

(b) providing, by the videoconferencing system, a selection option in the online meeting user interface to allow the cleared meeting participants to interact with other cleared meeting participants via the online meeting user interface using their respective participant computers prior to the initiation of the host-scheduled videoconferencing session, thereby allowing cleared meeting participants who are in the waiting room to interact with each other upon making the selection option, wherein the cleared meeting participants who interact with other cleared meeting participants in the waiting room are simultaneously admitted to the host-scheduled videoconferencing session upon initiation of the host-scheduled videoconferencing session;

(c) providing, by the videoconferencing system, a first process for creating subsets of a pre-specified number of cleared meeting participants who are in the waiting room and who selected to interact with other cleared meeting participants by making the selection option, wherein the cleared meeting participants in each subset can interact with each other in a pre-meeting networking session, and wherein the cleared meeting participants in each subset can interact only with other cleared meeting participants in the same subset; and (d) providing, by the videoconferencing system, a second process for allowing cleared meeting participants who are in the waiting room and who selected to interact with other cleared meeting participants by making the selection option, and who are in a created subset, to subsequently interact in a second and different created subset, and thereby interact only with other cleared meeting participants in the second and different created subset.

2. The automated method of claim 1 wherein the subsets of the pre-specified number of cleared meeting participants who can interact with each other in the waiting room are created by a random selection process that randomly selects for each subset the pre-specified number of cleared meeting participants in the waiting room who can interact with each other.

3. The automated method of claim 1 wherein the subsets of the pre-specified number of cleared meeting participants who can interact with each other in the waiting room are created by an algorithmic process that algorithmically selects for each subset the pre-specified number of cleared meeting participants in the waiting room who can interact with each other.

4. The automated method of claim 1 wherein the subsets of the pre-specified number of cleared meeting participants who can interact with each other in the waiting room are created by a manual process that allows a cleared meeting participant in the waiting room to select via a pre-meeting networking session user interface specific other cleared meeting participants in the waiting room whom the cleared meeting participant wishes to interact with.

5. The automated method of claim 1 wherein the subsets of the pre-specified number of cleared meeting participants who can interact with each other in the waiting room are created by a manual process that allows a cleared meeting participant in the waiting room to select via a pre-meeting networking session user interface a virtual table to be placed at so as to interact with other cleared meeting participants in the waiting room who also select via the pre-meeting networking session user interface to be placed at the same virtual table, wherein for each subset, the number of seats at the virtual table is equal to the pre-specified number of cleared meeting participants in the waiting room who can interact with each other, and wherein the second and different created subset is associated with a different arrangement of participants among the virtual tables.

6. The automated method of claim 1 wherein the subsets of the pre-specified number of cleared meeting participants who can interact with each other in the waiting room are created by a manual process that allows a cleared meeting participant in the waiting room to select via a pre-meeting networking session user interface a spatially depicted conversation group so as to interact with other cleared meeting participants in the waiting room who also select via the pre-meeting networking session user interface to be placed in the same spatially depicted conversation group, wherein the videoconferencing system sets a maximum number of cleared meeting participants who can join the same spatially depicted conversation group, and wherein the second and different created subset is associated with a different arrangement of participants among the spatially depicted conversation groups.

7. A computer program product for allowing meeting participants of a host-scheduled videoconferencing session to interact with each other via an online meeting user interface of a videoconferencing system using their respective participant computers prior to initiation of the host-scheduled videoconferencing session, wherein the meeting participants request to join the host-scheduled videoconferencing session by sending a request to the videoconferencing system from their respective participant computers, and wherein the videoconferencing system provides a waiting room for the meeting participants to be placed in prior to the initiation of the host-scheduled videoconferencing session, the computer program product comprising a non-transitory computer readable medium tangibly embodying computer-executable program instructions thereon that, when executed, cause one or more computing devices to:

(a) electronically clear meeting participants to participate in the host-scheduled videoconferencing session, by the video conferencing system, who have requested to join the host-scheduled videoconferencing session, wherein cleared meeting participants automatically join the host-scheduled videoconferencing session upon its initiation via their respective meeting participant computers, and wherein cleared meeting participants are in the waiting room prior to the initiation of the host-scheduled videoconferencing session;

(b) provide, by the videoconferencing system, a selection option in the online meeting user interface to allow the cleared meeting participants to interact with other cleared meeting participants via the online meeting user interface using their respective participant computers prior to the initiation of the host-scheduled videoconferencing session, thereby allowing cleared meeting participants who are in the waiting room to interact with each other upon making the selection option, wherein the cleared meeting participants who interact with other cleared meeting participants in the waiting room are simultaneously admitted to the host-scheduled videoconferencing session upon initiation of the host-scheduled videoconferencing session;

(c) provide, by the videoconferencing system, a first process for creating subsets of a pre-specified number of cleared meeting participants who are in the waiting room and who selected to interact with other cleared meeting participants by making the selection option, wherein the cleared meeting participants in each subset can interact with each other in a pre-meeting networking session, and wherein the cleared meeting participants in each subset can interact only with other cleared meeting participants in the same subset; and (d) provide, by the videoconferencing system, a second process for allowing cleared meeting participants who are in the waiting room and who selected to interact with other cleared meeting participants by making the selection option, and who are in a created subset, to subsequently interact in a second and different created subset, and thereby interact only with other cleared meeting participants in the second and different created subset.

8. The computer program product of claim 7 wherein the subsets of the pre-specified number of cleared meeting participants who can interact with each other in the waiting room are created by a random selection process that randomly selects for each subset the pre-specified number of cleared meeting participants in the waiting room who can interact with each other.

9. The computer program product of claim 7 wherein the subsets of the pre-specified number of cleared meeting participants who can interact with each other in the waiting room are created by an algorithmic process that algorithmically selects for each subset the pre-specified number of cleared meeting participants in the waiting room who can interact with each other.

10. The computer program product of claim 7 wherein the subsets of the pre-specified number of cleared meeting participants who can interact with each other in the waiting room are created by a manual process that allows a cleared meeting participant in the waiting room to select via a pre-meeting networking session user interface specific other cleared meeting participants in the waiting room whom the cleared meeting participant wishes to interact with.

11. The computer program product of claim 7 wherein the subsets of the pre-specified number of cleared meeting participants who can interact with each other in the waiting room are created by a manual process that allows a cleared meeting participant in the waiting room to select via a pre-meeting networking session user interface a virtual table to be placed at so as to interact with other cleared meeting participants in the waiting room who also select via the pre-meeting networking session user interface to be placed at the same virtual table, wherein for each subset, the number of seats at the virtual table is equal to the pre-specified number of cleared meeting participants in the waiting room who can interact with each other, and wherein the second and different created subset is associated with a different arrangement of participants among the virtual tables.

12. The computer program product of claim 7 wherein the subsets of the pre-specified number of cleared meeting participants who can interact with each other in the waiting room are created by a manual process that allows a cleared meeting participant in the waiting room to select via a pre-meeting networking session user interface a spatially depicted conversation group so as to interact with other cleared meeting participants in the waiting room who also select via the pre-meeting networking session user interface to be placed in the same spatially depicted conversation group,
- wherein the videoconferencing system sets a maximum number of cleared meeting participants who can join the same spatially depicted conversation group, and
- wherein the second and different created subset is associated with a different arrangement of participants among the spatially depicted conversation groups.

13. An automated method for allowing meeting participants of a host-scheduled videoconferencing session to interact with each other via an online meeting user interface of a videoconferencing system using their respective participant computers after completion of the host-scheduled video conferencing session, and wherein the videoconferencing system establishes a post-meeting time window after the end of the host-scheduled videoconferencing session, and the videoconferencing system establishes and maintains a post-meeting session during the post-meeting time window, the post-meeting session allowing cleared meeting participants to interact with each other via their respective participant computers, the method comprising:
- (a) electronically clearing meeting participants to participate in the host-scheduled videoconferencing session, by the video conferencing system, who have requested to join the host-scheduled videoconferencing session; and
- (b) automatically placing, by the videoconferencing system, the cleared meeting participants into the post-meeting session after the end of the host-scheduled videoconferencing session,
    - wherein the post-meeting session is a distinct and new session created subsequent to the end of the host-scheduled videoconferencing session, and wherein the time window of the post-meeting session is separate and distinct from a time window of the host-scheduled videoconferencing session.

14. The method of claim 13 further comprising:
- (c) receiving, by the videoconferencing system, video feeds of each of the meeting participants, the video feeds being camera-captured views of each of the meeting participants, and wherein the video feeds are used for the cleared meeting participants who interact with each other in the post-meeting session.

15. The method of claim 13 wherein the host-scheduled videoconferencing session is automatically initiated at a predetermined time.

16. The method of claim 13 wherein the host-scheduled videoconferencing session is manually initiated upon the videoconferencing system receiving an instruction to start the host-scheduled videoconferencing session from a host computer.

17. A computer program product for allowing meeting participants of a host-scheduled videoconferencing session to interact with each other via an online meeting user interface of a videoconferencing system using their respective participant computers after completion of the host-scheduled videoconferencing session, and wherein the videoconferencing system establishes a post-meeting time window after the end of the host-scheduled videoconferencing session, and the videoconferencing system establishes and maintains a post-meeting session during the post-meeting time window, the post-meeting session allowing cleared meeting participants to interact with each other via their respective participant computers, the computer program product comprising a non-transitory computer readable medium tangibly embodying computer-executable program instructions thereon that, when executed, cause one or more computing devices to:
- (a) electronically clear meeting participants to participate in the host-scheduled videoconferencing session, by the video conferencing system, who have requested to join the host-scheduled videoconferencing session; and
- (b) automatically place, by the videoconferencing system, the cleared meeting participants into the post-meeting session after the end of the host-scheduled videoconferencing session,
    - wherein the post-meeting session is a distinct and new session created subsequent to the end of the host-scheduled videoconferencing session, and wherein the time window of the post-meeting session is separate and distinct from a time window of the host-scheduled videoconferencing session.

18. The computer program product of claim 17 wherein the computer-executable program instructions, when executed, further cause the one or more computing devices to:
- (c) receive, by the videoconferencing system, video feeds of each of the meeting participants, the video feeds being camera-captured views of each of the meeting participants, and wherein the video feeds are used for the cleared meeting participants who interact with each other in the post-meeting session.

19. The computer program product of claim 17 wherein the host-scheduled videoconferencing session is automatically initiated at a predetermined time.

20. The computer program product of claim 17 wherein the host-scheduled videoconferencing session is manually initiated upon the videoconferencing system receiving an instruction to start the host-scheduled videoconferencing session from a host computer.

* * * * *